United States Patent
Wang et al.

(10) Patent No.: US 12,196,618 B2
(45) Date of Patent: Jan. 14, 2025

(54) PASSIVE INFRARED SENSOR SYSTEMS AND METHODS

(71) Applicant: The Texas A&M University System, College Station, TX (US)

(72) Inventors: Ya Wang, Los Altos, CA (US); Libo Wu, College Station, TX (US); Zhangjie Chen, College Station, TX (US)

(73) Assignee: The Texas A&M University System, College Station, TX (US)

( * ) Notice: Subject to any disclaimer, the term of this patent is extended or adjusted under 35 U.S.C. 154(b) by 410 days.

(21) Appl. No.: 17/620,619

(22) PCT Filed: Jun. 19, 2020

(86) PCT No.: PCT/US2020/038751
§ 371 (c)(1),
(2) Date: Dec. 17, 2021

(87) PCT Pub. No.: WO2020/257661
PCT Pub. Date: Dec. 24, 2020

(65) Prior Publication Data
US 2022/0252457 A1    Aug. 11, 2022

Related U.S. Application Data

(60) Provisional application No. 62/863,808, filed on Jun. 19, 2019, provisional application No. 62/863,842, (Continued)

(51) Int. Cl.
*G01J 5/08*    (2022.01)
*G01J 5/00*    (2022.01)
(Continued)

(52) U.S. Cl.
CPC .......... *G01J 5/0804* (2022.01); *G01J 5/0025* (2013.01); *G01J 5/025* (2013.01); *G01J 5/047* (2013.01);
(Continued)

(58) Field of Classification Search
CPC .......... G01J 5/0025; G01J 5/025; G01J 5/047; G01J 5/064; G01J 5/0804; G01J 5/0805; G01J 5/0831; G01J 5/0875; G01J 5/34
See application file for complete search history.

(56) References Cited

FOREIGN PATENT DOCUMENTS

| CN | 101153972 A | 4/2008 |
|---|---|---|
| EP | 2947432 A1 | 11/2015 |

(Continued)

OTHER PUBLICATIONS

Libo Wu et al.: Shuttered Passive Infrared Sensor for Occupancy Detection: Exploring a Low Power Electro-Mechanical Driving Approach, Proceedings of the ASME 2018 Conference on Smart Materials, Adaptive Structures and Intelligent Systems, pp. 1-12, Sep. 2018. [Retrieved: Sep. 16, 2020] from [https://doi.org/10.1115/SMASIS2018-81 12]. pp. 3-9; and figures 2-3.
(Continued)

*Primary Examiner* — Mark R Gaworecki
(74) *Attorney, Agent, or Firm* — Conley Rose, P.C.

(57) ABSTRACT

A passive infrared (PIR) sensor system, includes a PIR sensor configured to produce an output signal in response to receiving infrared (IR) radiation, an electronic shutter positionable in a field of view (FOV) of the PIR sensor, wherein the electronic shutter includes a liquid crystal (LC) material, wherein the electronic shutter includes a first state providing a first transmissivity of IR radiation through the electronic shutter and a second state providing a second transmissivity of IR radiation through the electronic shutter that is less than the first transmissivity, and a shutter actuator configured to
(Continued)

apply an actuation signal to the electronic shutter to actuate the electronic shutter between the first state and the second state.

19 Claims, 14 Drawing Sheets

Related U.S. Application Data filed on Jun. 19, 2019, provisional application No. 62/880,058, filed on Jul. 29, 2019.

(51) Int. Cl.

| | |
|---|---|
| *G01J 5/02* | (2022.01) |
| *G01J 5/04* | (2006.01) |
| *G01J 5/06* | (2022.01) |
| *G01J 5/0804* | (2022.01) |
| *G01J 5/0805* | (2022.01) |
| *G01J 5/0831* | (2022.01) |
| *G01J 5/0875* | (2022.01) |
| *G01J 5/34* | (2022.01) |

(52) U.S. Cl.
CPC ............ *G01J 5/064* (2022.01); *G01J 5/0805* (2022.01); *G01J 5/0831* (2013.01); *G01J 5/0875* (2013.01); *G01J 5/34* (2013.01)

(56) References Cited

FOREIGN PATENT DOCUMENTS

| | | | | |
|---|---|---|---|---|
| GB | 2572577 A | * | 10/2019 | .............. G01J 1/044 |
| KR | 10-0775015 B1 | | 11/2007 | |
| KR | 10-2009-0097544 A | | 9/2009 | |
| KR | 20090097544 A | * | 9/2009 | |
| WO | 2018-132546 A1 | | 7/2018 | |

OTHER PUBLICATIONS

International Search Report and Written Opinion dated Oct. 13, 2020, for Application No. PCT/US2020/038751.
CN Office Action dated Sep. 30, 2024, for Application No. CN 202080056704.4.

* cited by examiner

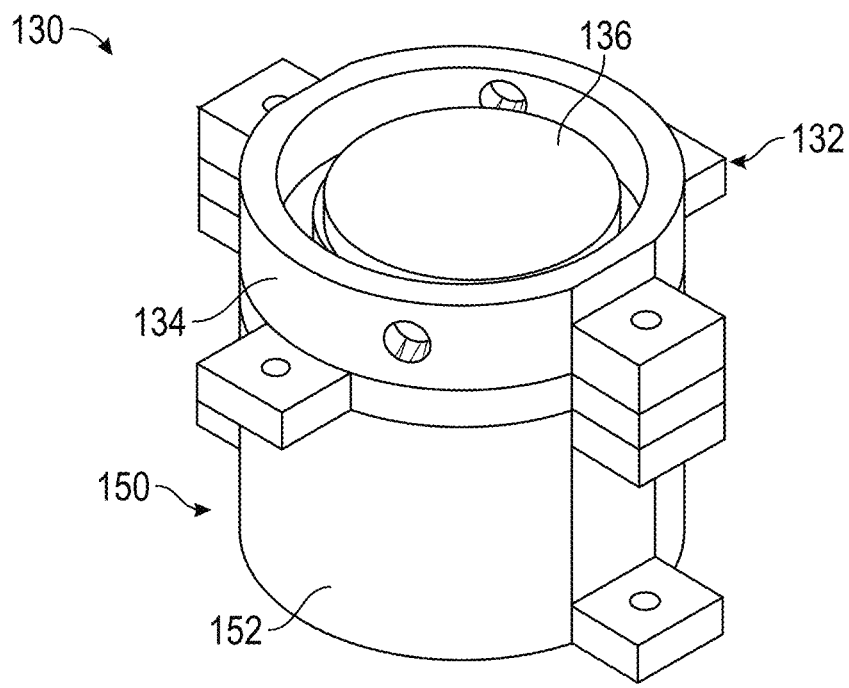
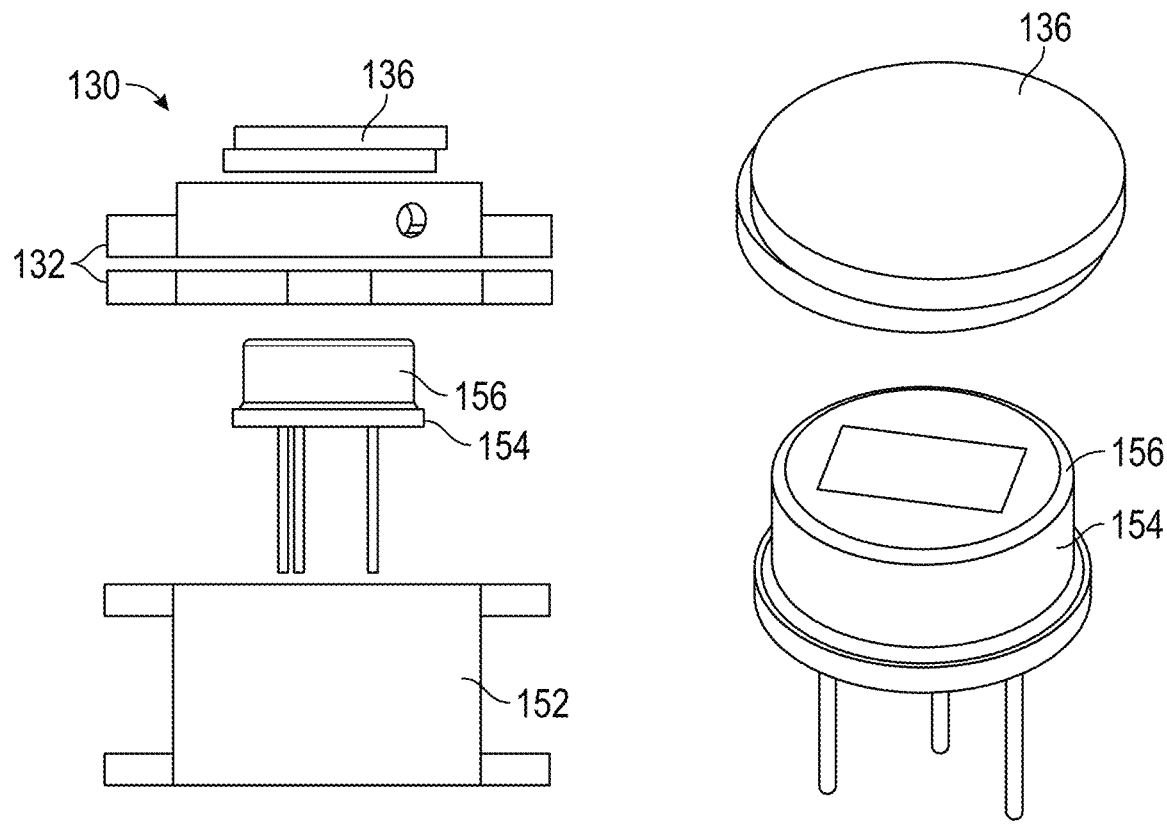
FIG. 4
FIG. 5
FIG. 6

PASSIVE INFRARED SENSOR SYSTEMS AND METHODS

CROSS-REFERENCE TO RELATED APPLICATIONS

This application is a 35 U.S.C. § 371 national stage application of PCT/US2020/038751 filed Jun. 19, 2020, and entitled "Passive infrared Sensor Systems and Methods which claims benefit of U.S. provisional patent application Ser. No. 62/883,808 filed Jun. 19, 2019, and entitled "Shuttered Passive Infrared Sensor Apparatus with a Low Power Lavet Motor Driving Approach for Stationary and Moving Occupancy Detection," U.S. provisional patent application Ser. No. 62/883,842 filed Jun. 19, 2019, and entitled "Shuttered Passive Infrared Sensor Apparatus with A Low Power Shape Memory Alloy Driving Approach for Stationary and Moving Occupancy Detection," and U.S. provisional patent application Ser. No. 62/880,058 filed Jul. 29, 2019, and entitled "Shuttered Passive Infrared Sensor Apparatus with A Low Power LWIR Liquid Crystal Optical Modulator for Stationary and Moving Occupancy Detection," each of which are hereby incorporated herein by reference in its entirety.

STATEMENT REGARDING FEDERALLY SPONSORED RESEARCH OR DEVELOPMENT

This invention was made with government support under DE-AR-0000945 awarded by the Advanced Research Projects Agency-Energy (ARPA-E). The government has certain rights in the invention.

BACKGROUND

Passive infrared sensors (PIR sensors) generally comprise electronic sensors which measure or detect infrared (IR) light or radiation that radiates or is given off objects within a field of view (FOV) of the PIR sensor. In other words, PIR sensors may generally detect the amount of IR radiation impinging upon the PIR sensor, where the amount of IR radiation impinging upon the PIR sensor may vary in response to changes in the temperature and other surface characteristics of objects within the FOV of the PIR sensor. PIR sensors may be utilized in manifold applications for detecting motion of particular objects within the FOV of the PIR sensor. As one example, PIR sensors may be utilized in detecting the motion of a human occupant within an indoor space of an external structure as part of a strategy for controlling lighting, heating, and/or cooling within the indoor space.

BRIEF SUMMARY OF THE DISCLOSURE

An embodiment of a passive infrared (PIR) sensor system comprises a PIR sensor configured to produce an output signal in response to receiving infrared (IR) radiation, an electronic shutter positionable in a field of view (FOV) of the PIR sensor, wherein the electronic shutter comprises a liquid crystal (LC) material, wherein the electronic shutter comprises a first state providing a first transmissivity of IR radiation through the electronic shutter and a second state providing a second transmissivity of IR radiation through the electronic shutter that is less than the first transmissivity, and a shutter actuator configured to apply an actuation signal to the electronic shutter to actuate the electronic shutter between the first state and the second state. In some embodiments, the actuation signal comprises a single pulse-width modulated (PWM) signal. In some embodiments, the electronic shutter comprises a LC element positioned between a pair of substrates. In certain embodiments, the LC element comprises a polymer dispersed liquid crystal (PDLC) material. In certain embodiments, each substrate comprises a Germanium window. In some embodiments, the electronic shutter further comprises a pair of electrodes in signal communication with the shutter actuator, and wherein each of the pair of electrodes is positioned between the LC element and one of the pair of substrates. In some embodiments, the PIR sensor system further comprises a controller configured to detect the presence of a stationary human occupant within the FOV of the PIR sensor based on the output signal of the PIR sensor.

An embodiment of a passive infrared (PIR) sensor system comprises a PIR sensor configured to produce an output signal in response to receiving infrared (IR) radiation, a mechanical shutter positionable in a field of view (FOV) of the PIR sensor, And a shutter actuator configured to displace the mechanical shutter across an IR sensing element of the PIR sensor to at least partially block the IR radiation received by the PIR sensor in response to receiving a single pulse-width modulated (PWM) signal. In some embodiments, the shutter assembly comprises a Lavet motor that comprises a stator comprising a pair of arms, a rotor positioned between the pair of arms of the stator, and a solenoid coil positioned about one of the arms of the stator. In some embodiments, the Lavet motor is configured to rotate the rotor at least 180° in response to receiving the single PWM signal from the shutter actuator. In certain embodiments, the PIR sensor system further comprises a gear train coupled between the Lavet motor and the mechanical shutter, wherein the gear train is configured to convert a rotational motion of the rotor into a sweeping motion of the mechanical shutter in opposing rotational directions. In certain embodiments, the shutter assembly comprises a shape memory (SMA) element configured to displace the mechanical shutter in response to an electrical current being applied to the SMA element. In some embodiments, the SMA element comprises a distended state and a contracted state, and wherein the SMA element is configured to rotate the mechanical shutter about a pivot axis in response to being actuated from the distended state to the contracted state. In some embodiments, the PIR sensor system further comprises a controller configured to detect the presence of a stationary human occupant within the FOV of the PIR sensor based on the output signal of the PIR sensor.

An embodiment of a passive infrared (PIR) sensor system comprises a PIR sensor configured to produce an output signal in response to receiving infrared (IR) radiation, and a shutter assembly comprising a mechanical shutter positionable in a field of view (FOV) of the PIR sensor, wherein the shutter assembly comprises a shape memory alloy (SMA) element configured to displace the mechanical shutter across an IR sensing element of the PIR sensor to at least partially block the IR radiation received by the PIR sensor in response to receiving an actuator signal. In some embodiments, the SMA element comprises a distended state and a contracted state, and wherein the SMA element is configured to rotate the mechanical shutter about a pivot axis in response to being actuated from the distended state to the contracted state. In some embodiments, the PIR sensor system further comprises a temperature sensor configured to measure a temperature of the SMA element and a position sensor configured to measure an angular position of the mechanical shutter about the pivot axis. In certain embodiments, the SMA element comprises a first SMA element and the shutter assembly further comprises a second SMA element, the first SMA element is configured to rotate the mechanical shutter in a first rotational direction in response to an electrical current being applied to the first SMA element, and the second SMA element is configured to rotate the mechanical shutter in a second rotational direction opposite the first rotational direction in response to an electrical current being applied to the second SMA element. In certain embodiments, the actuator signal comprises a pulse-width modulated (PWM) signal. In some embodiments, the PIR sensor system further comprises a controller configured to detect the presence of a stationary human occupant within the FOV of the PIR sensor based on the output signal of the PIR sensor.

BRIEF DESCRIPTION OF THE DRAWINGS

For a detailed description of exemplary embodiments of the disclosure, reference will now be made to the accompanying drawings in which:

FIG. 4 is a perspective view of a shuttered PIR sensor of the PIR sensor module of FIG. 2 according to some embodiments;

FIG. 5 is an exploded view of the shuttered PIR sensor of FIG. 4;

FIG. 6 is an exploded view of a PIR sensor and an electronic shutter of the shuttered PIR sensor of FIG. 4 according to some embodiments;

DETAILED DESCRIPTION OF THE DISCLOSED EMBODIMENTS

Figure 1:
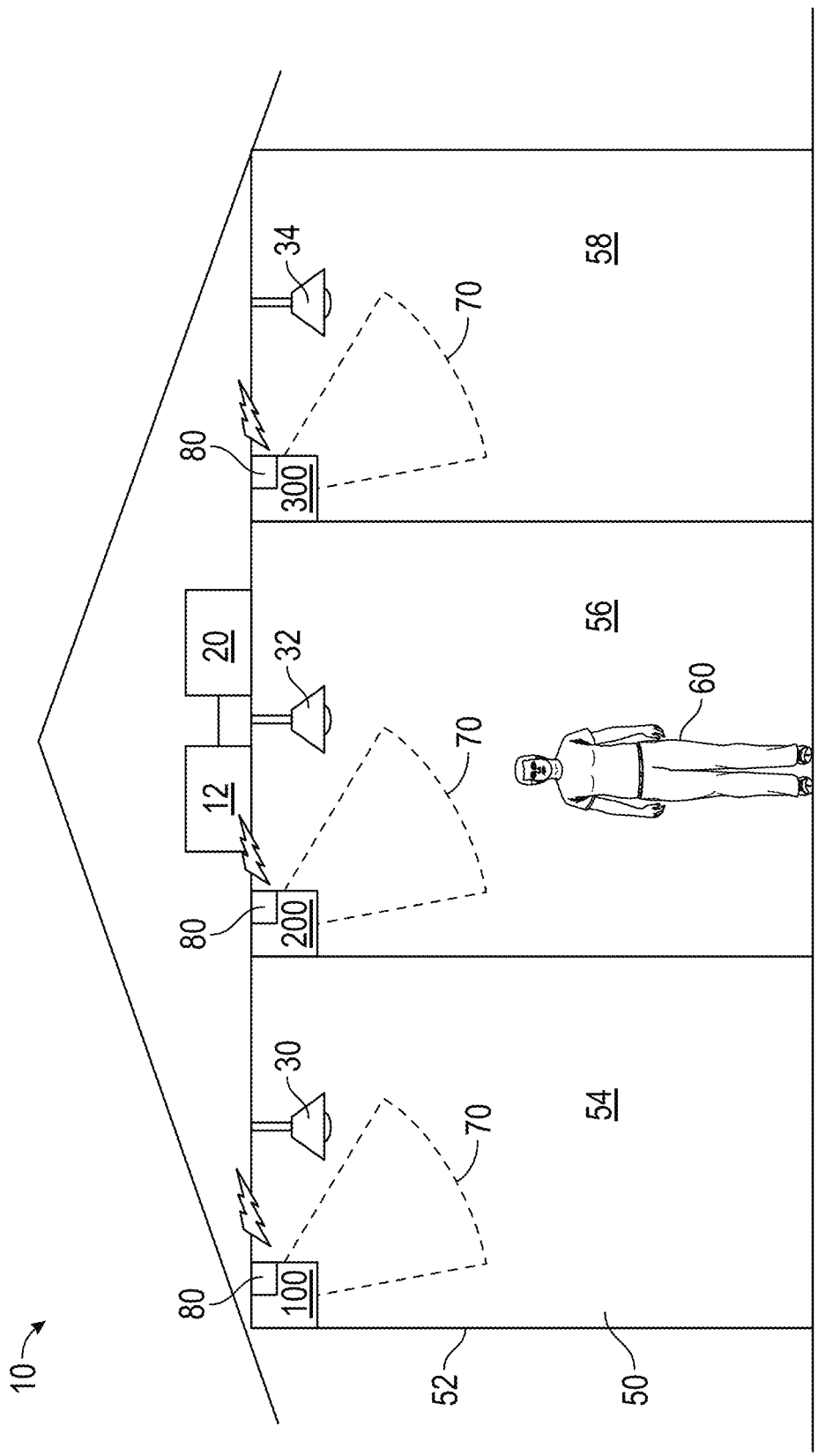
FIG. 1 is a schematic view of a PIR sensor system according to some embodiments.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

As described above, PIR sensors may be utilized in various applications including in applications pertaining to systems for controlling lighting, heating, and/or cooling of an indoor space within an external structure. While conventional PIR sensors may detect movement of a human occupant within the indoor space, the conventional PIR sensor may be unable to detect the presence of a stationary occupant given that conventional PIR sensors may only detect changes in the amount of IR impinging upon the PIR sensor over time.

The inability to detect stationary occupants may reduce the accuracy of the conventional PIR sensor in detecting the presence of an occupant within an indoor space or other area. Thus, the inability of conventional PIR sensors to detect stationary occupants may reduce the effectiveness of the conventional PIR sensor in providing accurate information to the control system for controlling the lighting, cooling, and/or heating of the indoor space. For example, the inaccuracy of the conventional PIR sensor in determining the presence of an occupant within the indoor space may reduce the comfort provided by the lighting, cooling, and/or heating as well as reduce the energy efficiency of the control system.

Accordingly, embodiments disclosed herein include PIR sensor modules configured to detect the presence of a stationary human occupant positioned within a FOV of the PIR sensor module. Embodiments disclosed herein include PIR sensor modules comprising electronic and mechanical shutters for selectably blocking or occluding IR radiation received by a PIR sensor of the PIR sensor module.

Referring to FIG. 1, a schematic diagram of an embodiment of a PIR sensor network or system 10 is shown. In the embodiment of FIG. 1, system 10 generally includes a system controller 12, a climate control system 20, a plurality of lights or light sources 30, 32, and 34, and a plurality of PIR sensor modules 100, 200, and 300. PIR sensor modules 100, 200, 300, lights 30, 32, and 34, and at least a portion of the climate control system 20 may be positioned in an indoor space 50 disposed within an external structure 52. Indoor space 50 may include a plurality of comfort zones 54, 56, and 58 positioned therein. It will be appreciated that while three comfort zones 54, 56, and 58 are shown, any number of zones may be present in the indoor space 50 of structure 52.

System controller 12 may be operated whereby each comfort zone 54, 56, and 58 may be separately and independently cooled and/or heated by climate control system 20. Climate control system 20 may be configured to selectively operate and implement one or more substantially closed thermodynamic refrigeration cycles to provide a cooling functionality and/or a heating functionality separately and independently to each comfort zone 54, 56, and 58. Additionally, system controller 12 may be operated to independently operate lights 30, 32, and 34 to selectively light each comfort zone 54, 56, and 58, where each light 30, 32, and 34 is positioned in a separate comfort zone 54, 56, and 58, respectively.

In this embodiment, one of the PIR sensors 100, 200, and 300 is positioned in a corresponding comfort zone 54, 56, and 58, respectively, of the indoor space 50. Each PIR sensor modules 100, 200, and 300 is generally configured to detect changes in the amount of IR radiation impinging upon the sensor modules 100, 200, and 300. In some embodiments, each PIR sensor modules 100, 200, and 300 may be configured to detect changes in the amount of IR radiation particularly within the long-wave IR spectrum of approximately between 8 micrometers (μm) and 12 μm. In this manner, each PIR sensor modules 100, 200, and 300 may detect the motion of an object, such as a human occupant 60, moving through a field of view 70 of the PIR sensor modules 100, 200, and 300.

Additionally, as will be further discussed herein, each PIR sensor modules 100, 200, and 300 is either mechanically or electronically shuttered to permit each PIR sensor modules 100, 200, and 300 to detect the presence of even a stationary occupant 60 within one of the comfort zones 54, 56, and 58 of the indoor space 50. By periodically shuttering or obstructing the FOV 70 of each PIR sensor modules 100, 200, and 300, the amount of IR radiation received by the PIR sensor modules 100, 200, and 300 changes when a stationary occupant 60 is within the FOV 70 of the PIR sensor modules 100, 200, and 300.

In this embodiment, each PIR sensor modules 100, 200, and 300 comprises a wireless transmitter 80 in signal communication with system controller 12. The wireless transmitter 80 may comprise a short-range radio transmitter such as a Bluetooth, Z-Wave, ZigBee, Insteon, and/or Red-LINK™ transmitter; however, in other embodiments, the configuration of each wireless transmitter 80 may vary. Each PIR sensor modules 100, 200, and 300 may wirelessly transmit information to the system controller 12 corresponding to the presence of an occupant 60 within the comfort zone 54, 56, and 58 in which the PIR sensor modules 100, 200, and 300, respectively, is positioned. In this manner, system controller 12 may operate climate control system 20 and/or lights 30, 32, and 34 in view of the occupancy information provided by PIR sensors 100, 200, and 300. For example, with occupant 60 being located in this embodiment in comfort zone 56, system controller 20 may operate climate control system 20 to provide cooling or heating to comfort zone 56 and/or activate or turn on light 32 of comfort zone 56. Additionally, given that no occupant is located within either comfort zones 54, 56, system controller 20 may deactivate or turn off lights 30, 34 and refrain from providing cooling or heating to comfort zones 54, 56. By possessing the ability to detect even stationary occupants 60 within each comfort zone 54, 56, and 58 of indoor space 50, PIR sensors 100, 200, and 300 may provide accurate information to system controller 20 as to the location of each occupant (e.g., occupant 60) located within indoor space 50. In this manner, the energy efficiency of system 10 may be maximized while providing the greatest amount of comfort possible to occupants of indoor space 50.

Figure 2:
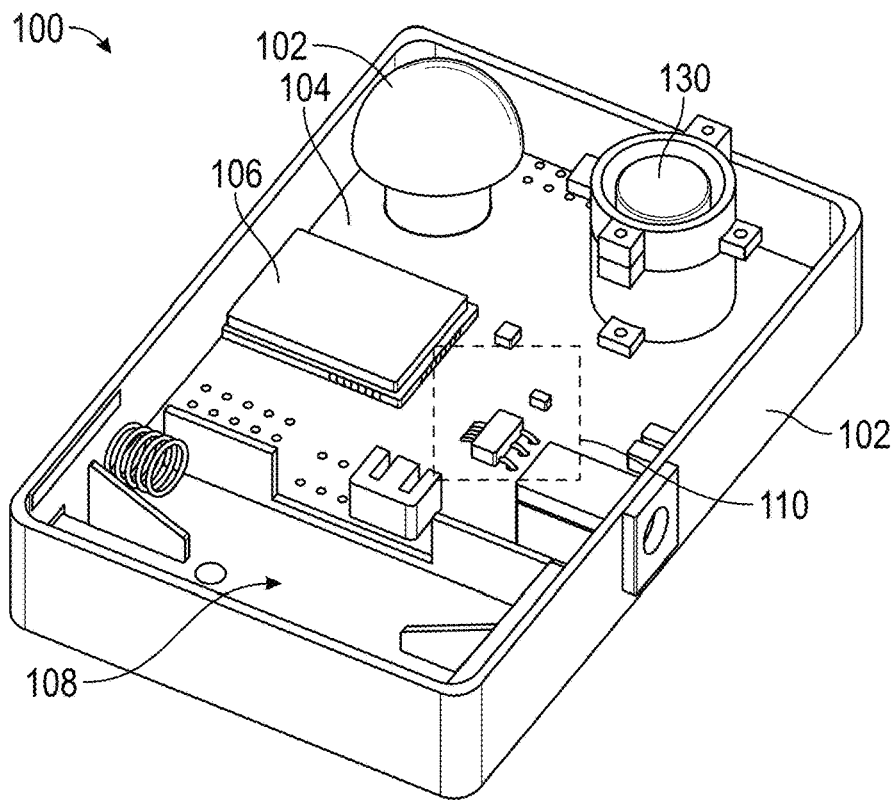
FIG. 2 is a perspective view of a PIR sensor module of the PIR sensor system of FIG. 1 according to some embodiments.
Figure 3:
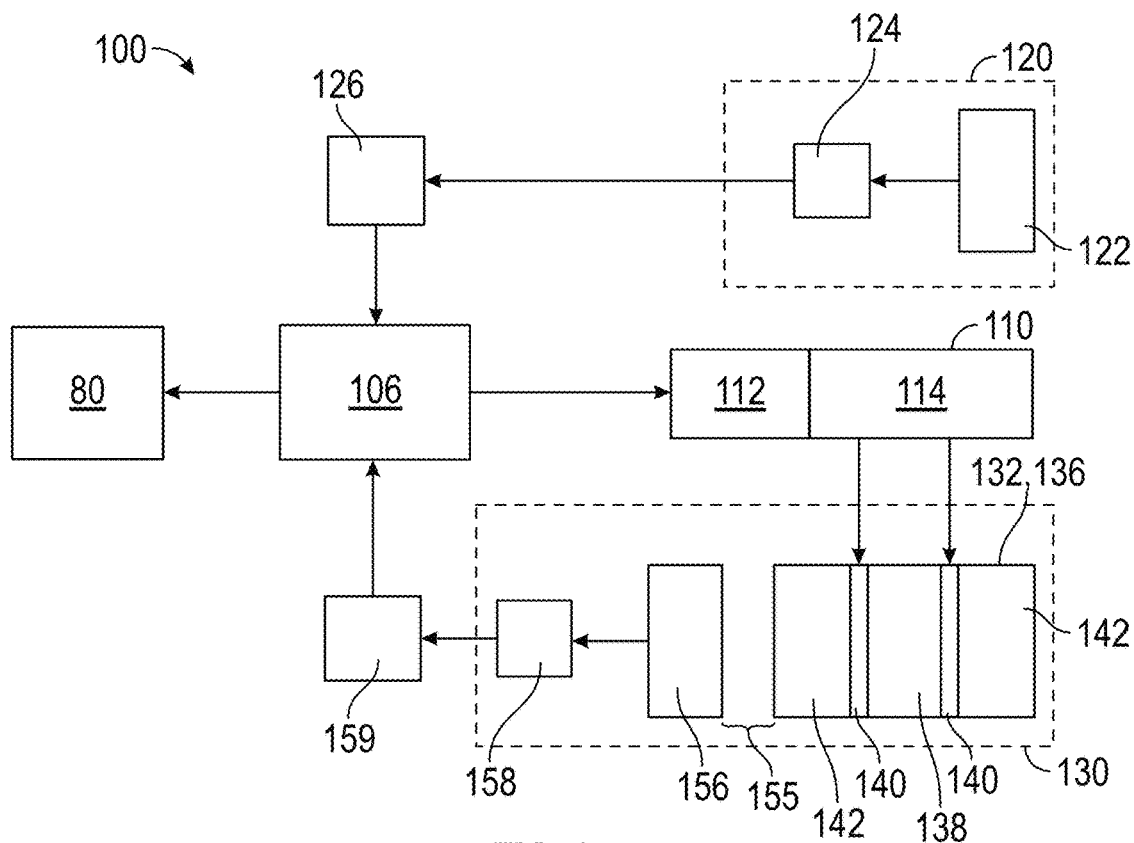
FIG. 3 is a schematic representation of the PIR sensor module of FIG. 2.

Referring to FIGS. 2, 3, an embodiment of the PIR sensor module 100 of system 10 is shown. In the embodiment of FIGS. 2, 3, PIR sensor module 100 generally includes an outer housing 102, a printed circuit board (PCB) 104, a controller or microcontroller unit (MCU) 106, a power supply 108, a shutter actuator or driving circuit 110, an unshuttered or shutterless PIR sensor 120, and an electronically shuttered PIR sensor 130.

The MCU 106 of PIR sensor module 100 is housed within outer housing 102 and is electrically connected to PCB 104. MCU 106 is generally configured to control the operation of PIR sensor module 100, including shutter actuator 110. MCU 106 may be in signal communication with a wireless transmitter 80 of PIR sensor module 100 for transmitting data from PIR sensor module 100 and the controller 12 of the system 10 shown in FIG. 1.

Power supply 108 is electrically connected to PCB 104 and is generally configured to supply electrical power to the various components of PIR sensor module 100, including MCU 106, shutter actuator 110, unshuttered PIR sensor 1200, and shuttered PIR sensor 130. In some embodiments, power supply 108 may comprise one or more electrical batteries (e.g., a plurality of AA batteries positioned in serial, etc.); however, in other embodiments, the configuration of power supply 108 may vary.

Unshuttered PIR sensor 120 of PIR sensor module 100 may generally include a PIR sensing element assembly 122 and an oscillator scope 124. The PIR sensing element assembly 122 of unshuttered PIR sensor 120 may comprise one or more PIR sensing elements connected in series with opposite polarizations to minimize the influence of environmental temperature changes. PIR sensing element assembly 122 may be generally configured to detect incidental IR radiation based on the pyroelectric effect or pyroelectricity, or in other words, the change of internal polarization of the PIR sensing elements of assembly 122 due to changes in heat flux.

Not intending to be bound by any theory, an output alternating current (AC) $i_p$ of a PIR sensing element (e.g., the sensing elements of assembly 122) having a sensing area A may be expressed in accordance with the following computation, where p' is the perpendicular component of the pyroelectric coefficient p, and dT/dt comprises the change of temperature of the sensing element over time:

$$i_p = Ap' \frac{dT}{dt} \quad (1)$$

Not intending to be bound by any theory, the radiation power W(t) applied to the sensing element modulated at a frequency ω may be expressed in accordance with the following computation, where $W_0$ comprises an amplitude of the radiation power W(t) applied to the sensing element, and t comprises time:

$$W(t) = W_0 e^{i\omega t} \quad (2)$$

Not intending to be bound by any theory, an analog output voltage $V_{out}(t)$ of the PIR sensing element may be expressed in accordance with the following computation, where Ce comprises the capacitance of the sensing element, η comprises the emissivity of the sensing element, H comprises the thermal capacity of the sensing element, $G_T$ comprises the thermal conductance of the sensing element to the surroundings, $R_{fb}$ and $C_{fb}$ comprise feedback resistance and capacitance, respectively, $\tau_T = H/G_T$ and $\tau_E = R_{fb}C_{fb}$ represent the thermal and electrical constant, respectively:

$$V_{out}(t) = \frac{R_{fb}\eta p' A \omega}{G_T (1+\omega^2 \tau_T^2)^{1/2}(1+\omega^2 \tau_E^2)^{1/2}} W(t) \quad (3)$$

In some embodiments, $\tau_T$ may be in the order of approximately 100 milliseconds (ms) while $\tau_E$ may be in the order of 10 ms. The analog output voltage $V_{out}(t)$ produced by the PIR sensing assembly 122 of unshuttered PIR sensor 120 may be collected by oscillator scope 124 and digitized by an analog-to-digital converter (ADC) 126 prior to being fed to the MCU 106 of PIR sensor module 100.

Referring to FIGS. 2-6, additional views of the PIR sensor 130 are shown in FIGS. 4-6. The shuttered PIR sensor 130 of PIR sensor module 100 generally comprises a shutter assembly 132, and a PIR sensor assembly 150. Shutter assembly 132 may generally comprise a generally cylindrical shutter housing 134 and an electronic shutter 136 received within the shutter housing 134 and positionable within the FOV 70 of shuttered PIR sensor 130. Electronic shutter 136 may generally comprise a liquid crystal (LC) element 138, a pair of electrodes 140 electrically connected to the shutter actuator 110, and a pair of substrates or windows 142. Electrodes 140 may be sandwiched between LC element 138 and substrates 142 and may be electrically connected to the shutter actuator 110 of the PIR sensor module 100.

Figure 7:
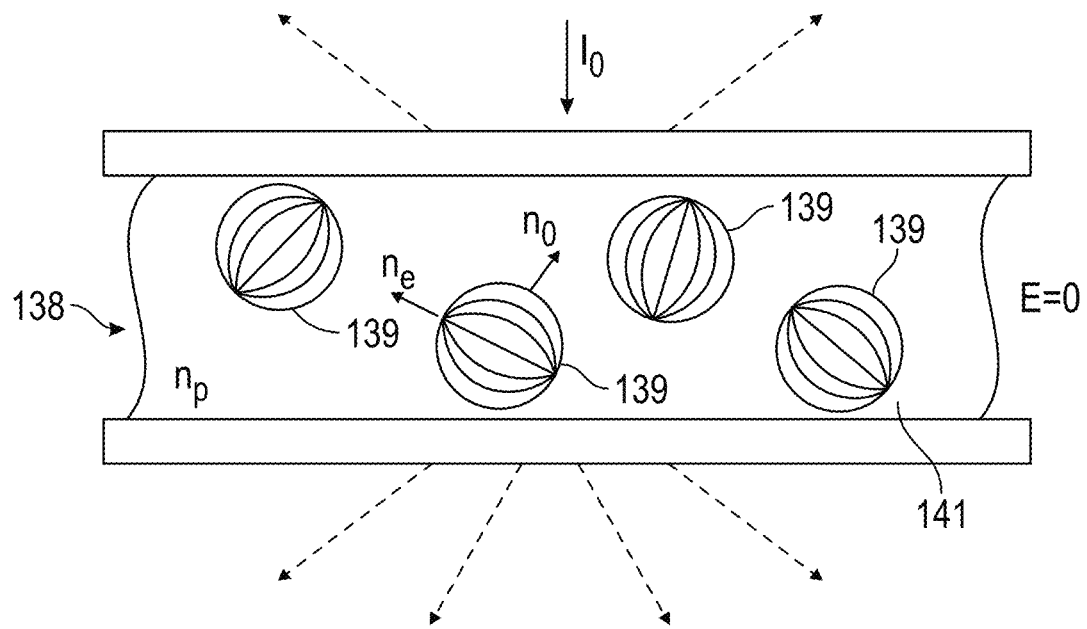
FIGS. 7, 8 are schematic representations of a liquid crystal (LC) element of the electronic shutter of FIG. 6 according to some embodiments.
Figure 8:
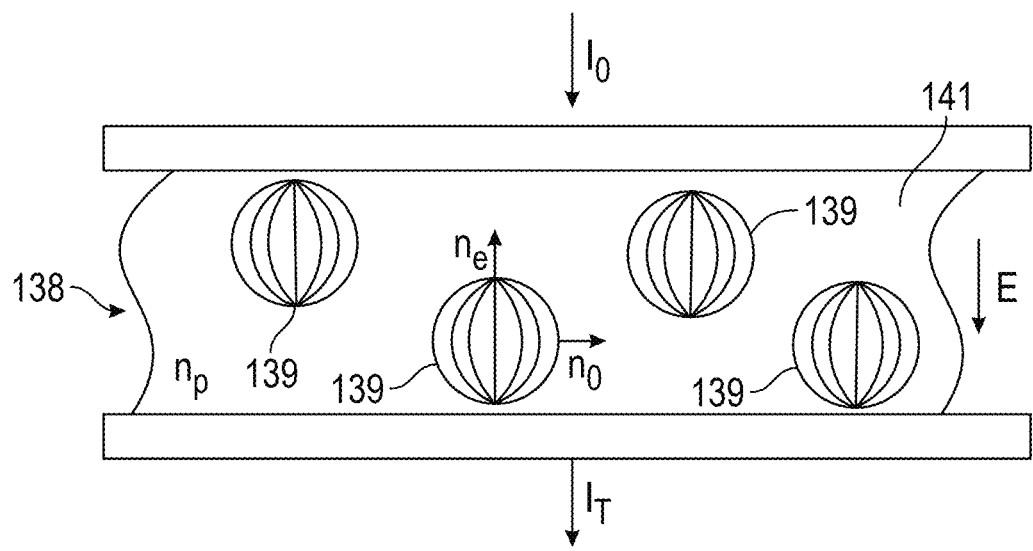

In the embodiment of FIGS. 2-6, LC element 138 comprises a polymer dispersed liquid crystal (PDLC) and substrates 142 may comprise IR transparent Germanium windows with an anti-reflection coating applied to one side thereof. Particularly, the PDLC element 138 may comprise a liquid crystalline material dispersed as droplets 139 (shown in FIGS. 7, 8 referenced below) in a polymer film 141, and may operate on the principle of electrically controlled birefringence. Referring briefly to FIGS. 7, 8, schematic views of the PDLC element 138 are shown. Particularly, when no voltage is applied (E=0) to PDLC element 138, corresponding to an OFF state of electronic shutter 136, the orientations of droplets 139 are random and the average refractive index of droplets 139 and polymer film 141 shows mismatch. Thus, in the OFF state, the incident IR radiation $I_0$ is scattered, as shown particularly in FIG. 7. Conversely, when an electric field E is applied across film 141 (e.g., via electrodes 140 shown in FIG. 3), corresponding to an ON state of electronic shutter 136, the droplets 139 align with the electric field E. When the refractive index ($n_p$) of the film 141 is close to the ordinary index of each droplet ($n_o$) of droplets 139, PDLC element 138 provides high transmission to the incident IR radiation $I_0$, as shown particularly in FIG. 8. Thus, in some embodiments, PDLC element 138 of electronic shutter 136 provides a first transmissivity of IR radiation therethrough when in the ON state and a second transmissivity of IR radiation therethrough when in the OFF state that is less than the first transmissivity. As used herein, the term "transmissivity" refers to the amount of IR radiation received by an electronic shutter (e.g., electronic shutter 136) which is permitted to travel through the electronic shutter to a PIR sensor (e.g., shuttered PIR sensor 130). Although in this embodiment element 138 comprises a PDLC element, in other embodiments, element 138 may comprise other LC materials. For instance, in certain embodiments, element 138 may comprise an anisotropic LC material, such as an LC material that has a core structure of tolane and terphenyl with polar groups such as cyano (CN), fluoro (F), and isothiocyanato (NCS). The anisotropic LC material may have long and short axes which may be oriented to control the transmission of IR radiation through the anisotropic LC material.

In some embodiments, PDLC element 138 may be prepared by solvent-induced phase separation (SIPS) followed by thermally induced phase separation (TIPS). During the SIPS process, a nematic LC material E7 and polyvinylpyrrolidone (PVP) may be dissolved in chloroform. The resulting mixture may then be distributed on one germanium substrate and the chloroform may be permitted to evaporate. After applying glass beads having a desired cell gap, another germanium substrate may then be pressed on top at a high temperature (e.g., approximately 100° C. in some embodiments). The size of each droplet 139 may be controlled by cooling the E7/PVP mixture at a desired cooling rate. To obtain the electro-optical property of the PDLC element 138, a Fourier-transform infrared spectroscopy spectrometer may be used while an external voltage source is applied to the PDLC element 138.

Referring again to FIGS. 2-6, the MCU 106 of PIR sensor module 100 may control the operation of electronic shutter 136 through the shutter actuator 110 of module 100. Specifically, MCU 106 may transmit actuation or pulse-width modulated (PWM) signals to shutter actuator 110 to control the ON and OFF state of electronic shutter 136. The pulse-wide modulated signals may comprise a plurality of pulses of a substantially constant voltage and/or current and having a length or duration that is controllable by the MCU 106. In some embodiments, shutter actuator 110 may generally comprise a waveform generator 112 and an amplifier 114 connected in series, where the waveform generator 112 receives the PWM signals from the MCU 106 and an output of the amplifier 114 is provided to electrodes 140; however, in other embodiments, the configuration of shutter actuator 110 may vary.

Figure 9:
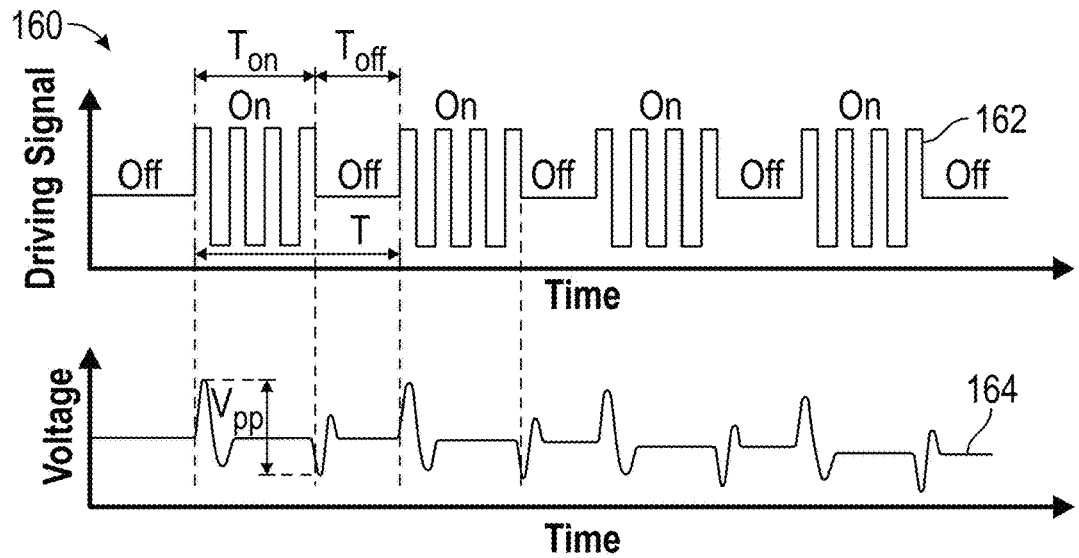
FIG. 9 is a graph illustrating exemplary properties of the PIR sensor module of FIG. 2 according to some embodiments.

For example, referring to FIG. 9, a graph 160 illustrating an exemplary driving signal 162 applied to the electronic shutter 136 via electrodes 140 and an exemplary output voltage 164 provided by the shuttered PIR sensor 130 over time is shown. In this example, the time duration for applying and not applying the AC voltage to the electrodes 140 from the shutter actuator 110 is defined as $T_{ON}$ and $T_{OFF}$, respectively, which may each equal approximately between 1 second (s) and 5 s.

Referring again to FIGS. 2-6, PIR sensor assembly 150 may generally comprise a generally cylindrical PIR sensor housing 152 and a PIR sensor 154 positioned within the sensor housing 154. Additionally, the PIR sensor 154 may generally comprise a PIR sensing element assembly 156 and an oscillator scope 158. Electronic shutter 136 may be positioned in front of the PIR sensor 154 whereby IR radiation must pass through electronic shutter 136 prior to being received on one or more sensing elements of the PIR sensing element assembly 156 of PIR sensor 154. Particularly, in some embodiments, a gap 155 of approximately 1 millimeter (mm) and 5 mm extends between the electronic shutter 136 and the PIR sensor 154; however, in other embodiments, the distance of gap 155 may vary. Additionally, in some embodiments, PIR sensing element assembly 156 and the oscillator scope 158 of PIR sensor 154 may be configured similarly as the PIR sensing element assembly 122 and oscillator scope 124 of the unshuttered PIR sensor 120. However, in certain embodiments, at least some of the sensing elements of assembly 156 may be covered by copper foil to cancel the compensation effect of the sensing elements of assembly 156 with opposite polarizations.

As previously described, the voltage output $V_{out}(t)$ of a PIR sensing element, such as the one or more PIR sensing elements of assembly 140 may be expressed in accordance with Equation (3) above. Additionally, the transmission spectrum of electronic shutter 136 in the ON and OFF states may be denoted as $T_{ON}(\lambda)$ and $T_{OFF}(\lambda)$ respectively. Not intending to be bound by any theory, for a heat source with the surface temperature of $T_s$, the IR radiation received by the shuttered PIR sensor 130 in the ON and OFF states in the range of $[\lambda_1, \lambda_2]$ may be expressed in accordance with the following computations, where $B(\lambda)$ comprises the black body radiation of a heat source, which only depends on the surface temperature:

$$W_{ON} = \int_{\lambda_1}^{\lambda_2} B(\lambda) T_{ON}(\lambda) d\lambda \tag{4}$$

$$W_{OFF} = \int_{\lambda_1}^{\lambda_2} B(\lambda) T_{OFF}(\lambda) d\lambda \tag{5}$$

In an example, and not intending to be bound by any theory, the transition between the ON and OFF states may be assumed to follow the following computations, where the rise and fall subscripts indicate the ON-OFF and OFF-ON transitions, respectively:

$$W_{rise}(t) = \frac{W_{ON} - W_{OFF}}{2} \exp(i\omega_r t) + \frac{W_{ON} + W_{OFF}}{2} \tag{6}$$

$$W_{fall}(t) = \frac{W_{ON} - W_{OFF}}{2} \exp(-i\omega_f t) + \frac{W_{ON} + W_{OFF}}{2} \tag{7}$$

The modulation frequencies $\omega_r$ and $\omega_f$ of Equations (6) and (7) above are based on the response time of the electronic shutter 136, where $$\omega_r = \frac{\pi}{t_r},$$

$\omega_f = \pi/t_f$, and where $t_r$ and $t_f$ represent the rise and decay time of electronic shutter 136.

Not intending to be bound by any theory, the voltage response or output $V_{out}$ of the shuttered PIR sensor 130 may be expressed in accordance with the following computation:

$$V_{out} = \frac{R_{fb} \eta p' A_p \omega (W_{ON} - W_{OFF})}{2G_T (1 + \omega^2 \tau_T^2)^{\frac{1}{2}} (1 + \omega^2 \tau_E^2)^{\frac{1}{2}}} \tag{8}$$

The modulation ($W_{ON} - W_{OFF}$) of the shuttered PIR sensor 130 may be defined with an arbitrary unit to quantify the modulation capability of the electronic shutter 136. As shown in Equation (8), the voltage response of shuttered PIR sensor 130 may be proportional to the modulation. Thus, whenever electronic shutter 136 changes state (e.g., either from OFF to ON or vice versa), shuttered PIR sensor 130 may generate voltage peaks at substantially the same time, as shown particularly by the voltage output 164 in FIG. 9. In other words, the actuation of shutter assembly 136 between the ON and OFF states periodically modulates the amount of IR radiation received by shuttered PIR sensor 130, resulting in the creation of voltage peaks. Moreover, shutter assembly 136 may modulate the IR radiation received by shuttered PIR sensor 130 without the need of a mechanically actuated shutter or any other moving parts, minimizing the power consumption and noise created by PIR sensor module 100 during operation.

Data provide by the unshuttered PIR sensor 120 may be fused with data provided by the shuttered PIR sensor 130 to increase the detection range of PIR sensor module 100. For example, in some embodiments, the unshuttered PIR sensor 120 may have a FOV (e.g., approximately 103°×103° in some embodiments) that is greater than a FOV of the shuttered PIR sensor 130 (e.g., approximately 90°×90° in some embodiments. Although in his embodiment, PIR sensor module 100 includes unshuttered PIR sensor 120, in other embodiments, module 100 may not include unshuttered PIR sensor module 120 and instead may only include one or more shuttered PIR sensor modules 130.

For stationary occupants, voltage peaks will be outputted from the shuttered PIR sensor 130 when the electronic shutter 136 turns ON or OFF while the unshuttered PIR sensor 120 will provide a substantially flat or constant voltage output. In accordance with Equation (8) above, the peak-to-peak voltage output ($V_{pp}$) depends on the IR radiation received by the shuttered PIR sensor 130. Thus, the $V_{pp}$ in a period T can be used to classify the occupied and unoccupied states of a particular room or comfort zone monitored by the PIR sensor module 100 given that the amount of IR radiation received by the shuttered PIR sensor 130 will be greater when a stationary human occupant is within the FOV 70 of the PIR sensor module 100. In other words, the $V_{pp}$ of the shuttered PIR sensor 130 will be greater when a stationary human occupant is within the FOV 70 of the PIR sensor module 100 than when no human occupant is present within the FOV 70 of the PIR sensor module 100. Thus, the difference between the difference between the $V_{pp}$ outputted by the shuttered PIR sensor 130 when a stationary human occupant is within the FOV 70 of the PIR sensor module 100 and when no human occupant is present within FOV 70 may be used to determine the presence of a stationary human occupant within the FOV 70. For a moving occupant, the motion of the human body may result in even higher $V_{pp}$ values.

A threshold value comprising a $V_{pp}$ value outputted by at least one of the PIR sensors 120, 130 that corresponds to the presence of a human occupant (stationary or in motion) within the FOV 70 of the PIR sensor module 100 may be determined by monitoring the $V_{pp}$ of the PIR sensors 120, 130 as the shutter assembly 136 is operated when a human occupant (stationary and/or in motion) is both present and absent from the FOV 70 of the PIR sensor module 100. In this manner, threshold values may be adaptively obtained based on indoor background infrared radiation, which may be periodically measured and calibrated. Once one or more threshold values are determined for the PIR sensor module 100, the MCU 106 of the PIR sensor module 100 may monitor the $V_{pp}$ outputted by the PIR sensors 120, 130 and transmit one or more signals to the controller 12 indicative of the room or zone in which the PIR sensor module 100 is positioned being occupied by a human in response to the detection of a threshold value from one of the PIR sensors 120, 130 of PIR sensor module 100. In some embodiments, MCU 106 may only transmit a digitized sampling of the analog voltage outputted by PIR sensors 120, 130, and controller 12 may determine and monitor one or more threshold values of PIR sensor module 100.

Figure 10:
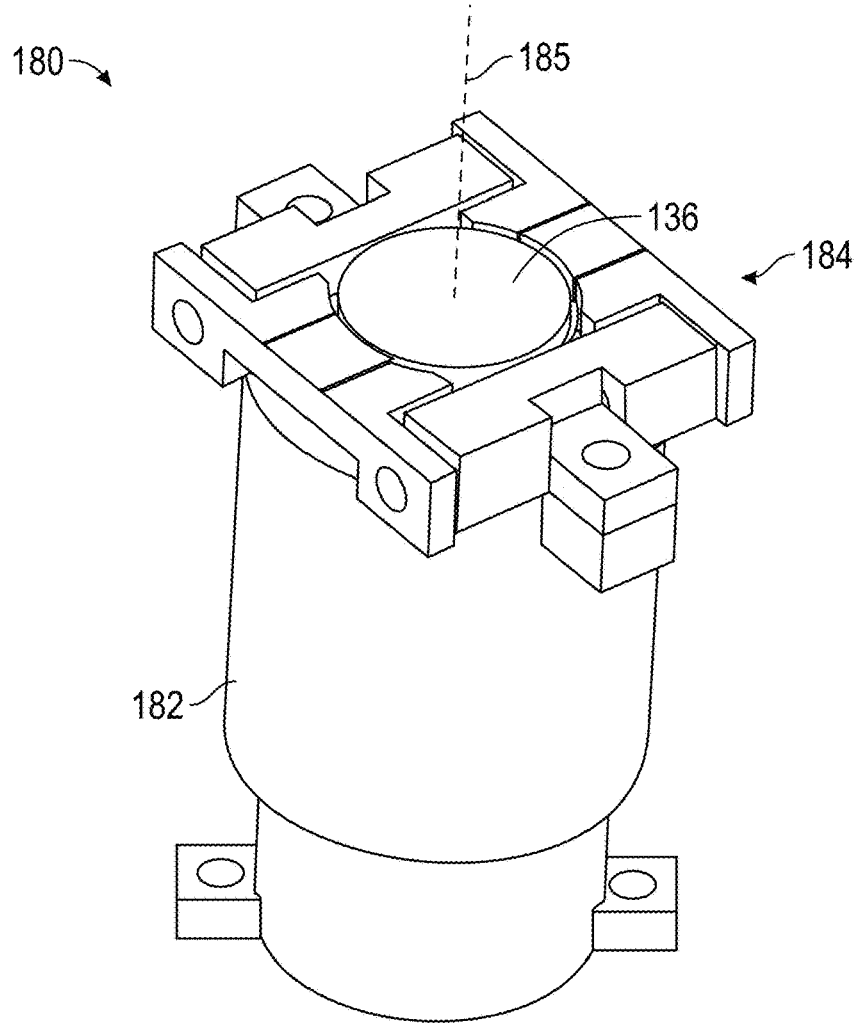
FIG. 10 is a perspective of another PIR sensor module of the PIR sensor system of FIG. 1 according to some embodiments.

Referring briefly to FIG. 10, another embodiment of a PIR sensor module 180 is shown. PIR sensor module 180 includes features in common with the PIR sensor module 100 shown in FIGS. 2-6, and shared features may be labeled similarly. Particularly, PIR sensor module 180 is similar to module 100 except that module 180 comprises an outer housing 182 and a positioning assembly 184 configured to control and selectably adjust the gap 155 between the electronic shutter 136 and the PIR sensor 154. Positioning assembly 184 may also adjust a levelness (relative a longitudinal or central axis 185 of PIR sensor 154 in this embodiment) of the electronic shutter 136. By allowing for control of the levelness of electronic shutter 136 and the magnitude of the gap 155, positioning assembly 184 may provide for a more reliable and stable installation of electronic shutter 136 and to help ensure that a a relative angle of PIR sensing element assembly 156 and electronic shutter 136 is parallel with assembly 156. Additionally, PIR sensor module 180 may include a copper electric terminal to provide a larger electrical contact area.

Figure 11:
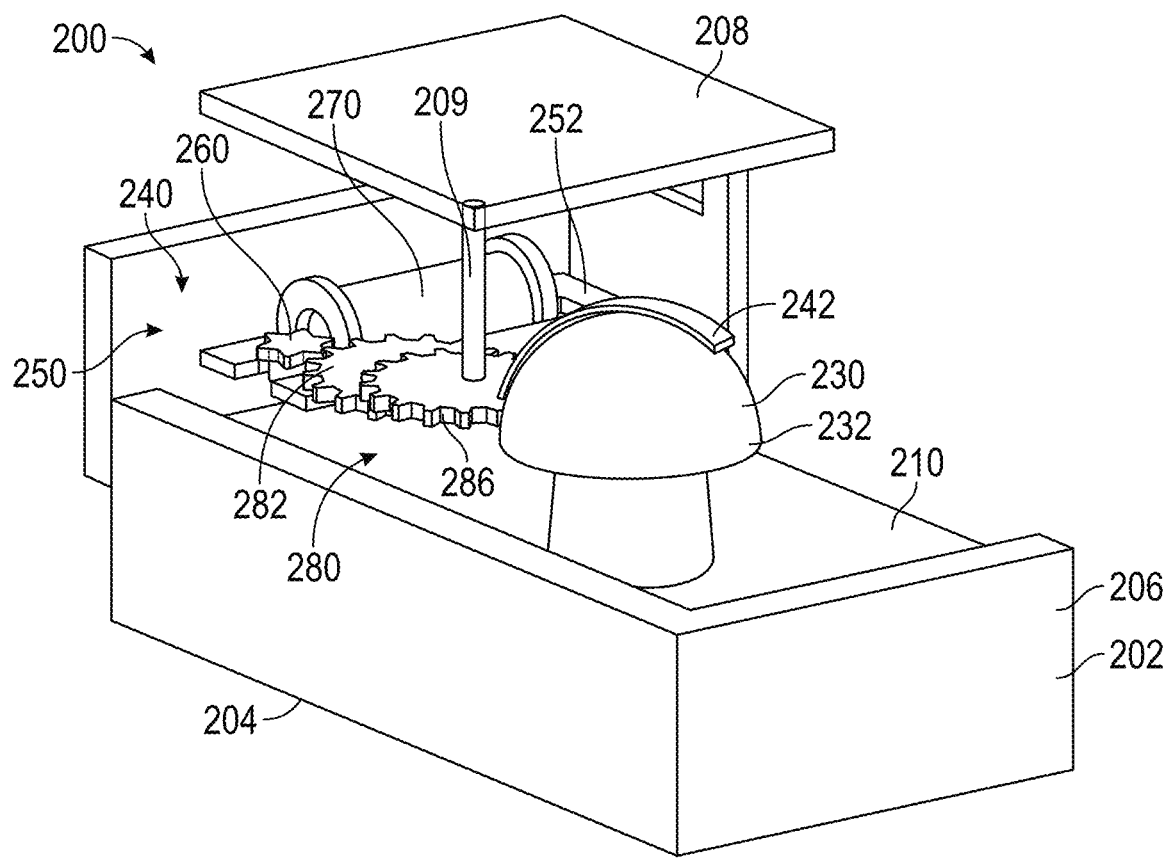
FIG. 11 is a perspective of another PIR sensor module of the PIR sensor system of FIG. 1 according to some embodiments.
Figure 12:
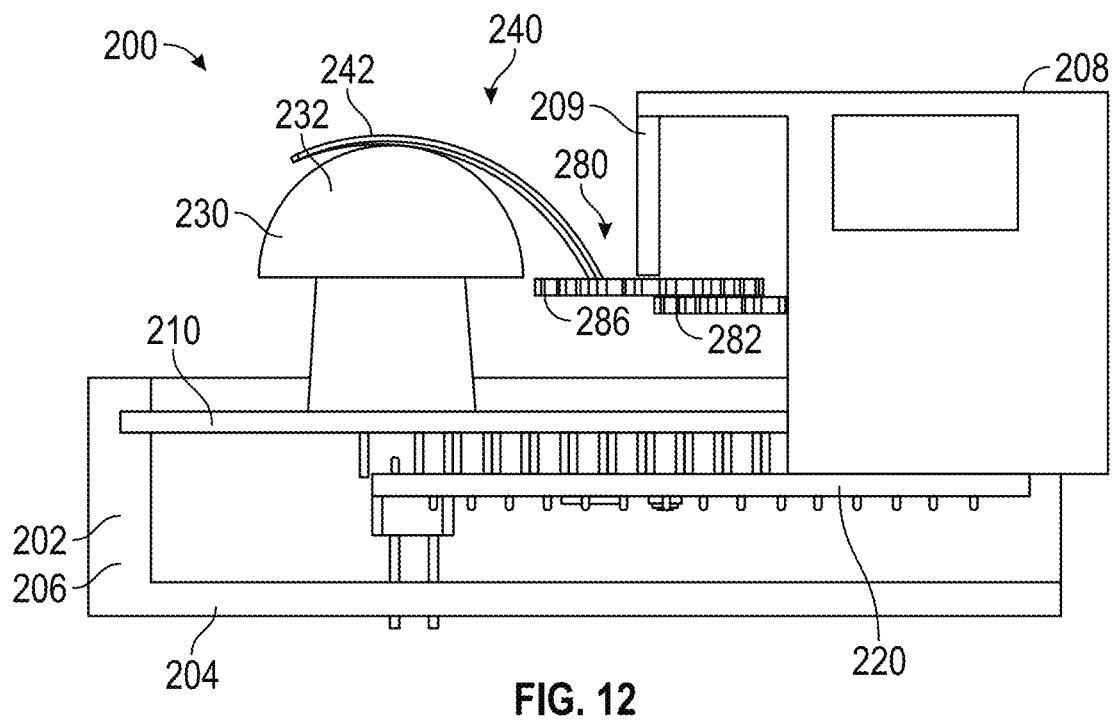
FIG. 12 is a side view of the PIR sensor module of FIG. 11.
Figure 13:
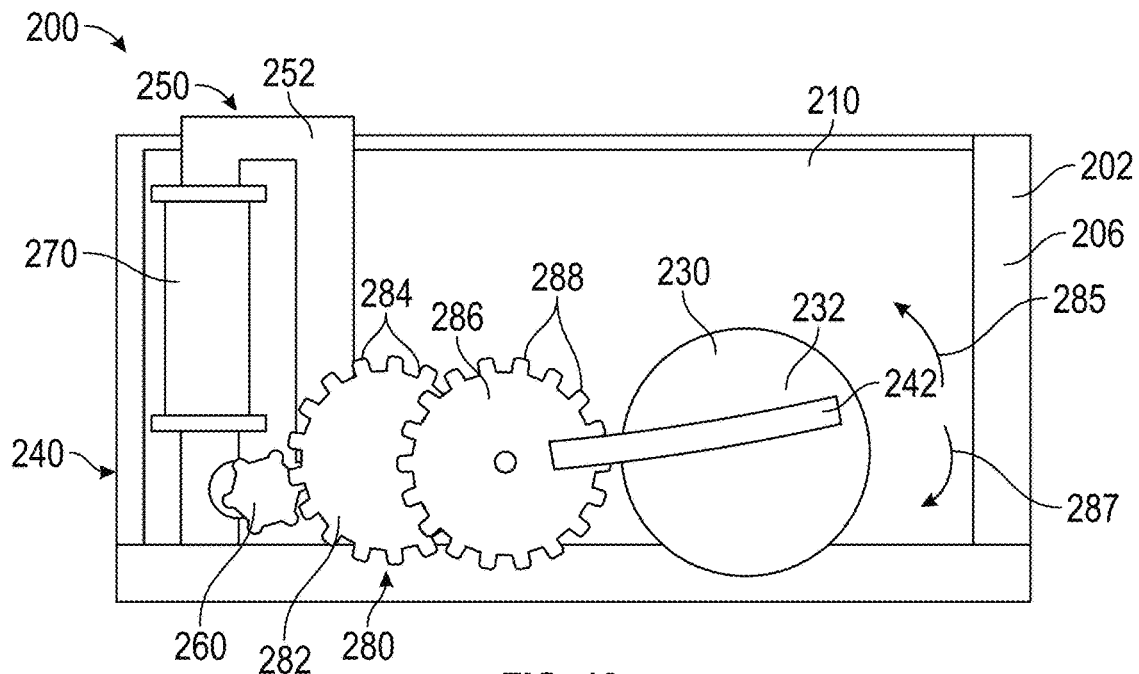
FIG. 13 is a top view of the PIR sensor module of FIG. 11.

Referring to FIGS. 11-13, an embodiment of the PIR sensor module 200 of system 10 is shown. In the embodiment of FIGS. 11-13, PIR sensor module 200 generally includes a housing or support frame 202, a PCB 210, a controller or MCU 220, a PIR sensor 230, and a shutter assembly 240 positionable within the FOV 70 of shuttered PIR sensor 230.

Housing 202 of PIR sensor module 200 provides physical support to the components thereof, including PCB 210, MCU 220, PIR sensor 230, and shutter assembly 240. In this embodiment, housing 202 generally includes a planar bottom panel 204, one or more side panels 206 extending from the bottom panel 204, and a top panel 208 opposite the bottom panel 204. In some embodiments, PCB 210 may be coupled to an inner surface of the one or more side panels 206 of housing 202. Housing 202 may also include a gear shaft 209 extending from the top panel 208 and which is coupled to the shutter assembly 240 of PIR sensor module 200. In other embodiments, the configuration of housing 202 may vary from that shown in FIGS. 11-13.

The MCU 220 of PIR sensor module 200 is coupled to housing 202 and is electrically connected to PCB 210, PIR sensor 230, and one or more components of shutter assembly 240, as will be described further herein. MCU 220 is generally configured to control the operation of PIR sensor module 200, including shutter assembly 240. MCU 220 may be in signal communication with a wireless transmitter 80 of PIR sensor module 200 (not shown in FIGS. 11-13) for transmitting data from PIR sensor module 200 and the controller 12 of the system 10 shown in FIG. 1.

PIR sensor module 200 may also comprise a power supply (not shown in FIGS. 11-13) configured to power MCU 220 as well as other components of PIR sensor module 200 such as PIR sensor 230 and/or shutter assembly 240. In some embodiments, the power supply may comprise one or more electrical batteries; however, in other embodiments, the configuration of the power supply of PIR sensor module 200 may vary.

The PIR sensor 230 of PIR sensor module 200 may generally comprise a PIR sensing element assembly 232 including one or more PIR sensing elements and an oscillator scope for collecting an analog voltage produced by the PIR sensing element assembly of PIR sensor 230. In some embodiments, the PIR sensing element assembly 230 may be configured similarly or share features in common with the PIR sensing element assemblies 122, 154 shown in FIG. 3; however, in other embodiments, the configuration of PIR sensing element assembly 232 may vary in configuration from assemblies 122, 154. An analog voltage output of the PIR sensor 230 may be connected to an (not shown in FIGS. 11-13) which may feed a digitized output to the MCU 220 of PIR sensor module 200.

Shutter assembly 240 may be controlled by MCU 220 and is generally configured to selectably block or occlude IR radiation received by the sensing element assembly 232 of PIR sensor 230 with a mechanical shutter 242 to thereby enable the detection of stationary human occupants within a room or zone (e.g., comfort zones 54, 56, and 58 shown in FIG. 1) in which the PIR sensor module 200 is positioned.

For example, referring briefly to FIGS. 15-19, schematic views of the operation of shutter assembly 240 are shown. PIR sensor module 200 may comprise a Fresnel lens (not shown in FIGS. 11-15). Additionally, PIR sensing element assembly 232 of PIR sensor 230 may comprise four sensing elements SE1, SE2, SE3, and SE4. $I_e$ shown in FIG. 15 may indicates the length and width of each sensing element SE1, SE2, SE3 and SE4, $I_S$ shown in FIG. 16 may represent the space between two elements, and $I_c$ shown in FIG. 16 may represent the width of mechanical shutter 242. When shutter 242 travels across the FOV of PIR sensor 230, the radiant energy received by at least some of the sensing elements SE1, SE2, SE3, and SE4 may be partially blocked a the factor of (1−k), where k comprises the transmittance of the mechanical shutter 242

Figure 15:
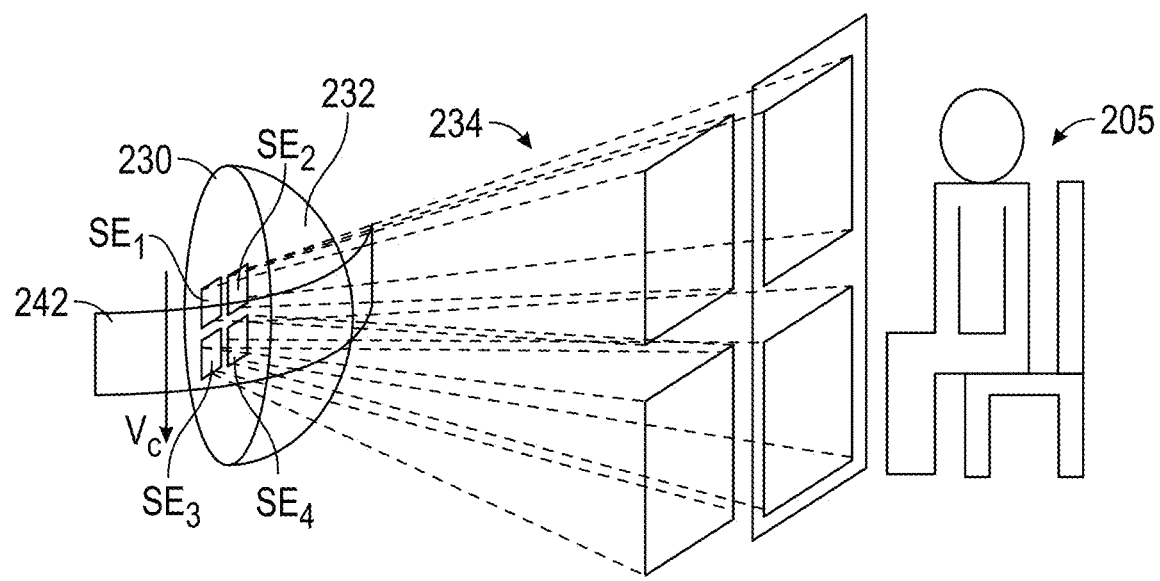
FIGS. 15-20 are schematics representing an exemplary operation of a shutter assembly of the PIR sensor module of FIG. 11 according to some embodiments.
Figure 16:
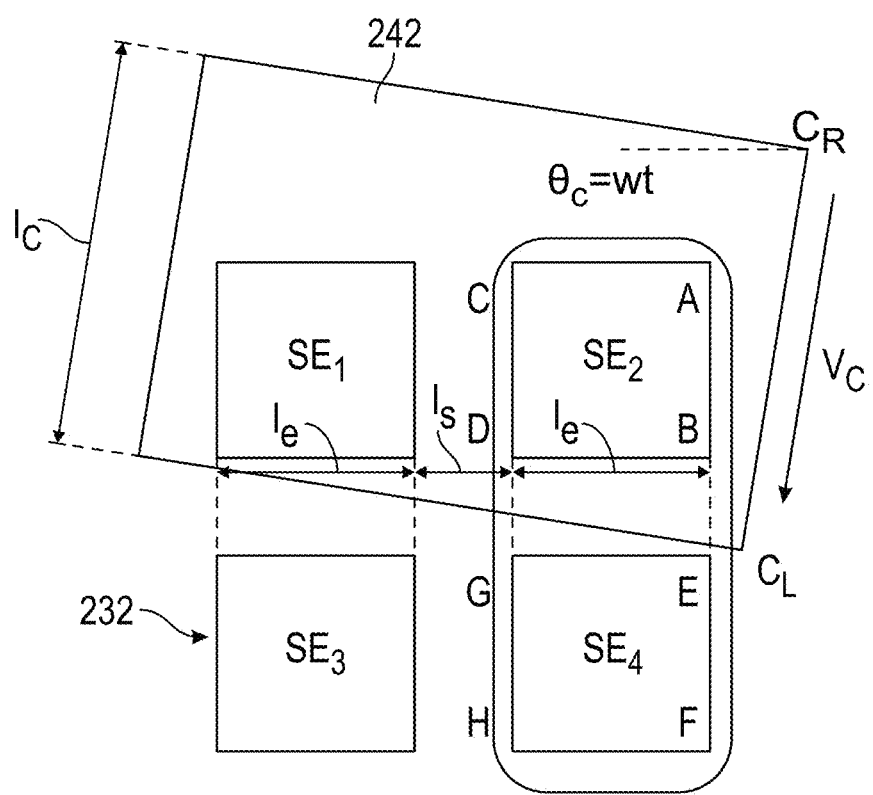
Figure 17:
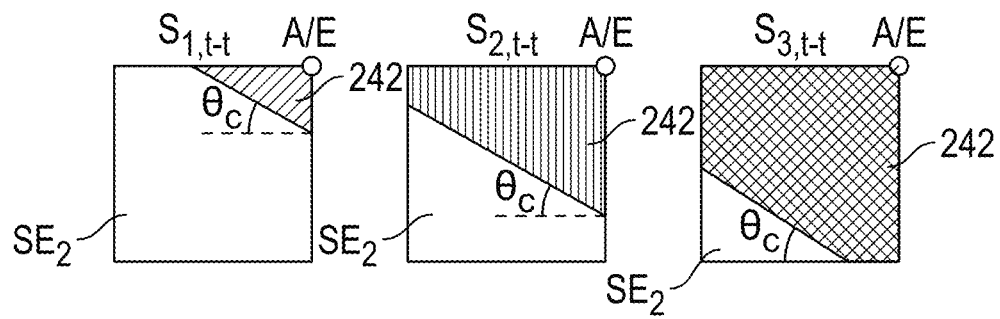

The Fresnel lens of PIR sensor module 200, which may be positioned outside the sensing elements SE1, SE2, SE3, and SE4, may segment the FOV of PIR sensor 230 into a series of sensing beams 234. Each sensing beam 234 may correspond to one of the sensing elements SE1, SE2, SE3, and SE4 of sensing element assembly 232. Not intending to be bound by any theory, scaled by the Fresnel lens with a factor of γ, parameters $I_e$, $I_s$ and $I_c$ become $I'_e$, $I'_s$, and $I'_s$, respectively. For example, in an embodiment, when an occupant 205 is sitting approximately 5 meters (m) in front of the PIR sensor 230, $f_e$ may equal approximately 30 centimeters (cm). In this example, the cross-section of seated occupant 205 may be around 70 cm×40 cm, which may cover two sensing beams 234, as shown in FIGS. 15, 16.

The mechanical shutter 242, travelling at a velocity $V_c$ in this example across PIR sensor 230, may sequentially cover each of the sensing beams 234. Taking sensing elements SE2 and SE4 for example, $t_{Li}$, $t_{Ri}$ may correspond to the time when the left and the right sides of shutter 242 arrive at its vertex i, where i=A, B, C, D, E, F, G, H, and time range from $t_{LA}$ to $t_{RH}$ represents one segmented scanning period. Not intending to be bound by any theory, three distinct covering configurations, $S_{1,n}(t)$, $S_{2,n}(t)$ and $S_{3,n}(t)$ (shown in FIG. 17, for each sensing element SE1-SE4 can be expressed in accordance with the following computations, where T comprises the shuttering period in seconds that is equal to $2\pi/\omega$, where $\omega$ is the modulation frequency, where r is the radius of shutter 242:

$$S_{1,ti}(t) = [(t - t_i)2\pi r/T]^2 / \sin(4\pi t/T) \quad (9)$$

$$S_{2,ti}(t) = \frac{l'_e(t - t_i)2\pi r}{T} - l'^2_e \sin\left(\frac{2\pi t}{T}\right) \Big/ 2 \quad (10)$$

$$S_{2,ti}(t) = l'^2_e - \left[\sqrt{2}\, l'_e \cos\left(45° - \frac{2\pi t}{T}\right) - (t - t_i)2\pi r/T\right]^2 \Big/ \sin(2\pi t/T) \quad (11)$$

Figure 18:
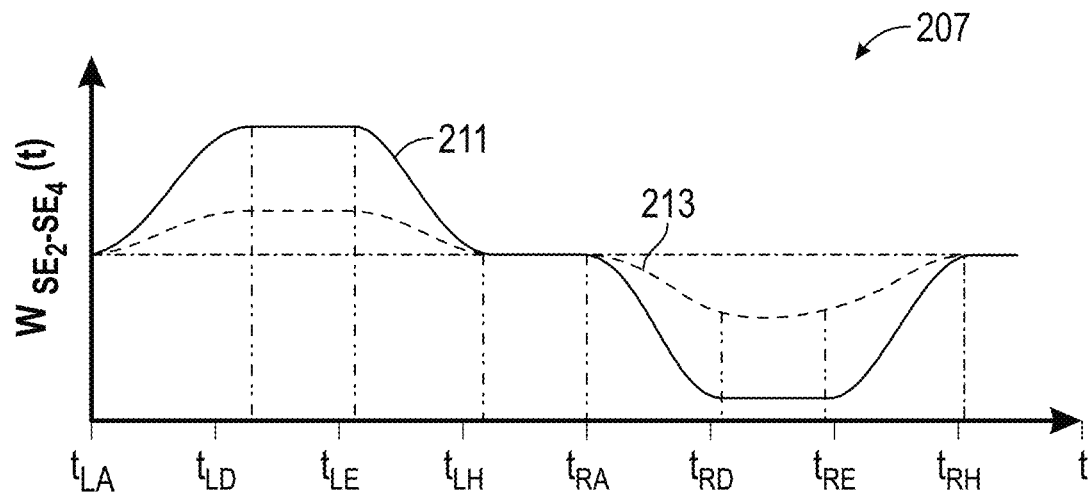
Figure 19:
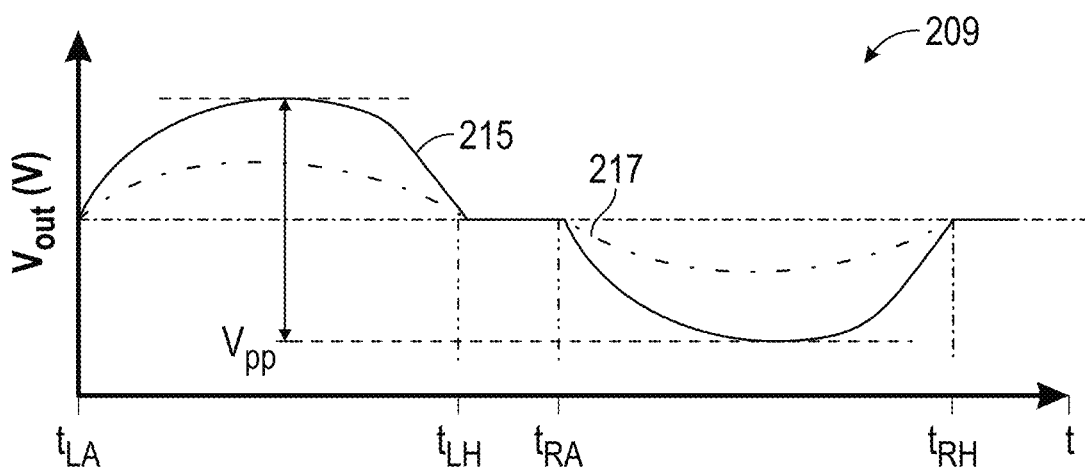

Radiant energy received by SE2, SE4, respectively may be determined according to Equation (3) above, where the output voltage $V_{out}(t)$ may be proportional to the received energy difference $W_{SE2\text{-}SE4}(t)$, as shown in graphs 207, 209 of FIGS. 18, 19, respectively. Particularly, solid lines 211, 215 of graphs 207, 209, respectively, indicate responses to an occupied scenario, where the radiant energy density (energy per area) received by the sensor from an individual may correspond to ø. Dashed lines 213, 217 of graphs 207, 209, respectively, may represent an unoccupied scenario where the ambient radiant energy density may correspond to ø=ø$_{amb}$. Note that, graphs 207, 209 are schematic diagrams and are not to scale. Not intending to be bound by any theory, energy difference $W_{SE2\text{-}SE4}(t)$ for occupied and unoccupied states may be expressed in accordance with the following computation:

$$W_{SE2-SE4}(t) = \begin{cases} \phi(1-\kappa)S_{j,t-t_{LA}} & j = \begin{cases} 1, & t \in (t_{LA}, t_{LC}] \\ 2, & t \in (t_{LC}, t_{LB}] \\ 3, & t \in (t_{LB}, t_{LD}] \end{cases} \quad (12) \\ \phi(1-\kappa)l'^2_e & t \in (t_{LD}, t_{LE}] \\ \phi(1-\kappa)(l'^2_e - S_{j,t-t_{LE}}) & j = \begin{cases} 1, & t \in (t_{LE}, t_{LG}] \\ 2, & t \in (t_{LG}, t_{LF}] \\ 3, & t \in (t_{LF}, t_{LH}] \end{cases} \\ 0 & t \in (t_{LH}, t_{RA}] \\ -\phi(1-\kappa)S_{j,t-t_{RA}} & j = \begin{cases} 1, & t \in (t_{RA}, t_{RC}] \\ 2, & t \in (t_{RC}, t_{RB}] \\ 3, & t \in (t_{RB}, t_{RD}] \end{cases} \\ -\phi(1-\kappa)l'^2_e & t \in (t_{RD}, t_{RE}] \\ -\phi(1-\kappa)(l'^2_e - S_{j,t-t_{RE}}) & j = \begin{cases} 1, & t \in (t_{RE}, t_{RG}] \\ 2, & t \in (t_{RG}, t_{RF}] \\ 3, & t \in (t_{RF}, t_{RH}] \end{cases} \end{cases}$$

Generally, when in an unoccupied state, $W_{SE2\text{-}SE4}(t)$ is typically small due to the small ø$_{amb}$ from ambient, which induces a small peak-to-peak value $V_{ppe}$. When in an occupied state, the induced peak-to-peak value $V_{pp}$ may be used to detect occupancy (e.g., the presence of a human occupant in the FOV of PIR sensor module 200) using a threshold value $V_{th}$. Thus, if $(V_{pp}-V_{ppe})>V_{th}$, then a moving or stationary occupant is detected; otherwise, the environment is indicated to be unoccupied.

Referring again to FIGS. 11-14, shutter assembly 240 of PIR sensor module 200 generally includes mechanical shutter 242, a shutter actuator or motor 250, and a transmission or gear train 280 coupled between the mechanical shutter 242 and motor 250. Motor 250 may be generally configured to displace the mechanical shutter 242 across an IR sensing element of PIR sensor 230 to at least partially block the IR radiation received by PIR sensor 230 in response to receiving a single actuator signal from MCU 220. In some embodiments, motor 250 may comprise a Lavet motor having a relatively lower power consumption, noise level, and higher accuracy than conventional electrical servo or stepper motors due, at least in part, to the simpler construction of the Lavet motor 250 relative to conventional electric motors.

Figure 14:
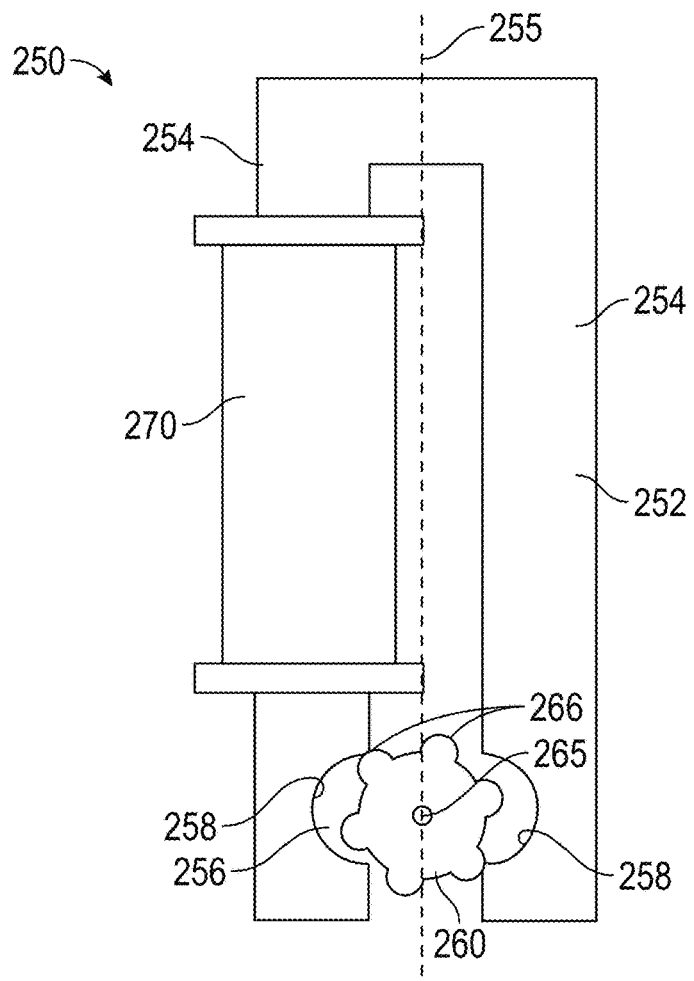
FIG. 14 is a top view of a Lavet motor of the PIR sensor module of FIG. 11 according to some embodiments.

As shown particularly in FIG. 14, in some embodiments, Lavet motor 250 may generally comprise a U-shaped stator 252, a rotor 260, and a solenoid coil 270 electrically connected to the MCU 220 of PIR sensor module 200. Stator 252 may extend along a longitudinal axis 255 which extends orthogonal a central or longitudinal axis 265 of rotor 260. Additionally, stator 252 may comprise a pair of arms 254 and form a rotor receptacle 256 defined by a pair of opposed curved inner surfaces 258 of the arms 254 of stator 252. Solenoid 270 of Lavet motor 250 may extend entirely around one of the arms 254 of stator 252. Rotor 260 may be magnetically coupled to stator 252 and may be positioned within rotor receptacle 256 equidistantly between the opposed curved inner surfaces 258 of the arms 254 of stator 252.

MCU 220 may be configured to transmit PWM signals to solenoid 270 to control the operation of Lavet motor 250 whereby mechanical shutter 242 of shutter assembly 240 may sweep across PIR sensor 230 sequentially in opposing rotational directions. For example, referring now to FIG. 20, a schematic 275 illustration of the operation of Lavet motor 250 is shown. Particularly, in this example, rotor 260 may begin in a first rotational position 261 relative stator 252, and remain in the first position 261 during a first time period 269 which comprises a first time delay ($t_{delay}$), where zero current is applied to the stator 252 from the solenoid 270.

Figure 20:
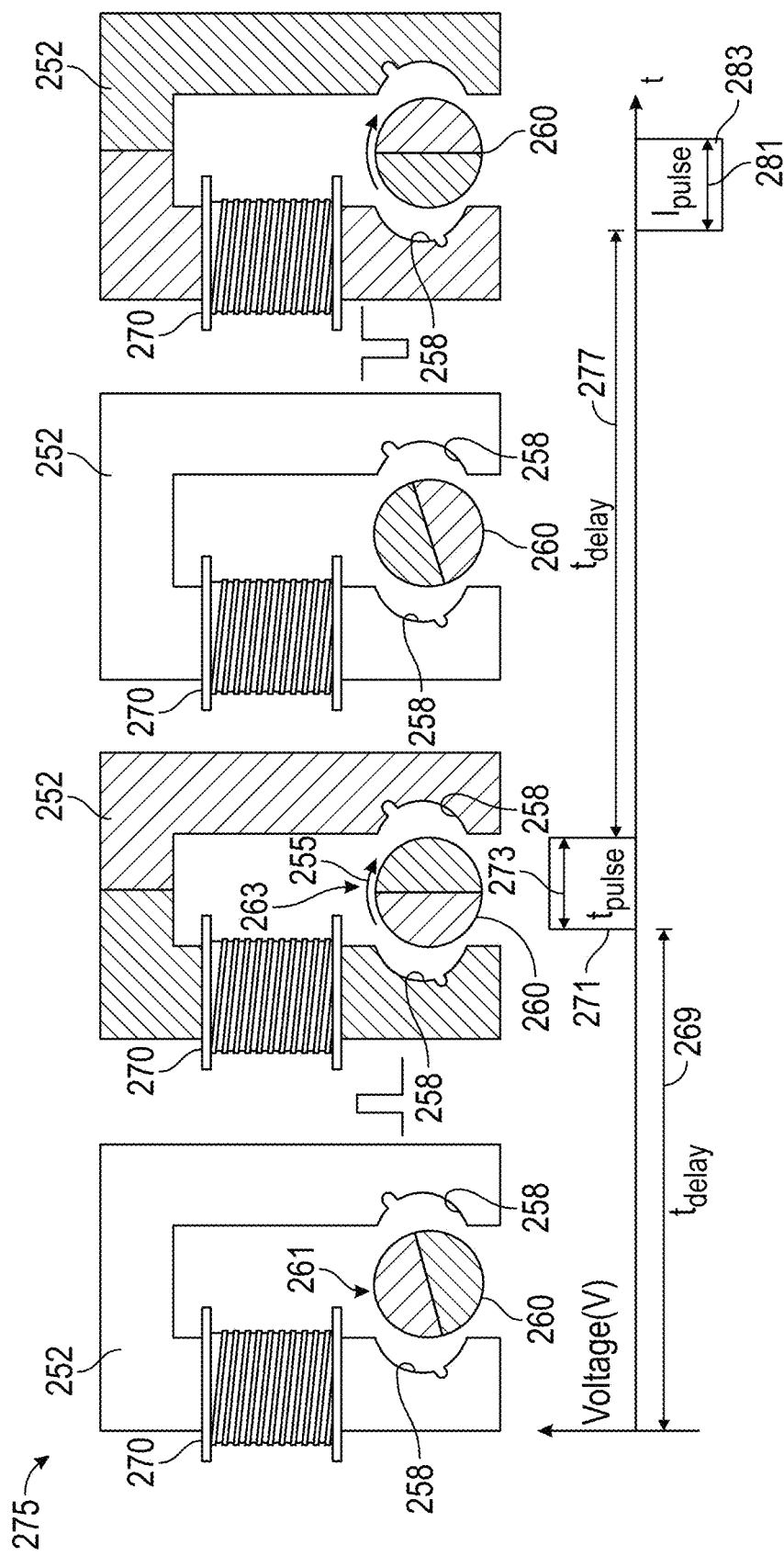

In the example of FIG. 20, following the first time period 269, a first PWM signal 271 or $t_{pulse}$ may be applied to the solenoid 270 across a second time period 273, the first PWM signal 271 comprising a non-zero current supplied by the MCU 220. The first pulse or PWM signal 217 may have a substantially constant voltage and/or current and a duration or length which may be controlled by MSCU 220. Stator 252 is energized in response to the application of first PWM signal 271, causing rotor 260 to rotate about central axis 265 from the first position 261 in a first rotational direction 255. As rotor 260 rotates in the first rotational direction 255 from the first position 261, the application of the first PWM signal 271 may cease at the termination of the second time period 273.

In this example, the second time period 273 may be followed by a third time period 277 comprising a second time delay ($t_{delay}$) where zero current is applied to the stator 252 from the solenoid 270. During the third time period 277, a reluctant force applied to rotor 260 from stator 252 positions rotor 260 in a second angular position 263 which is angularly spaced from the first angular position 261. In some embodiments, the second angular position 263 may be spaced approximately 180° from the first angular position 261; however, in other embodiments, the degree of angular spacing between positions 261, 263 following the application of a single PWM signal to solenoid 270 may vary. The second angular position 263 may comprise a cogging point defined by the geometry of stator 252 whereby an air gap between rotor 260 and the curved inner surfaces 258 of stator 252 is minimized.

In the example shown in FIG. 20, the third time period 277 may be followed by a fourth time period 281. A second PWM signal 283 or $t_{pulse}$ having an opposite polarity of the first PWM signal 271 may be applied to the solenoid 270 across the fourth time period 273. The second PWM signal 283 may comprise a non-zero current supplied by the MCU 220 having an opposite polarity of the first PWM signal 271 applied during the second time period 273. Stator 252 is energized in response to the application of the second PWM signal 283, causing rotor 260 to rotate about central axis 265 from the second position 263 in the first rotational direction 255. As rotor 260 rotates in the first rotational direction 255 from the second position 263, the application of the second PWM signal 283 may cease at the termination of the fourth time period 281. The fourth time period 281 may be followed by an additional time delay ($t_{delay}$) where zero current is applied to the stator 252 from the solenoid 270, causing the rotor 260 to come to rest in a cogging point comprising a third angular position that is angularly spaced from the second angular position 263. In some embodiments, the third angular position may be the same as the first angular position 261. In other words, in some embodiments, rotor 260 may travel a full 360° about central axis 265 in response to the application of two PWM signals 273, 283 having the opposite polarity.

Referring again to FIGS. 11-14, gear train 280 of PIR sensor module 200 is generally configured to convert the rotary motion of rotor 260 into a sweeping or pendulum motion of mechanical shutter 242 across the sensing element assembly 232 of PIR sensor 230 whereby mechanical shutter 242 may at least partially block or occlude the IR radiation received by PIR sensor 230. Gear train 280 may comprise a pair of gears 282, 286 having a plurality of teeth 284, 288, respectively. The teeth 284 of first gear 282 may mesh with teeth 266 formed on an outer circumference of the rotor 260 of Lavet motor 250. Mechanical shutter 242 may be attached to an outer surface of the second gear 286 of gear train 280. Additionally, gear train 280 may be rotatably coupled to the housing 202 of PIR sensor module 200 via the gear shaft 209 of housing 202.

In some embodiments, during the application of a single PWM signal (e.g., PWM signals 273, 283 shown in FIG. 20) to motor 250 from MCU 220, rotary motion of rotor 260 caused by the application of the PWM signal may be transferred to mechanical switch 242 as a sweeping or pendulum motion across the sensing element assembly 232 of PIR sensor 230. Particularly, during the application of a single PWM signal to Lavet motor 250, mechanical shutter 242 may sweep across sensing element assembly 232 in a first rotational direction 285, come to a rest, and subsequently sweep across sensing element assembly 232 in a second rotational direction 287 opposite the first rotational direction 285. Thus, in some embodiments, mechanical shutter 242 may sweep across and thereby at least partially block or occlude IR radiation received by PIR sensor 230 twice in response to the application of a single PWM signal to the Lavet motor 250 of PIR sensor module 200. By performing one or more sweeps of the mechanical shutter 242 across PIR sensor 230 in response to the application of only a single PWM signal to Lavet motor 250, the power consumption of PIR sensor module 200 may be minimized.

As described above, the sweeping of mechanical shutter 242 across PIR sensor 230 may produce an induced $V_{pp}$ voltage from the PIR sensor 230 which may be used to detect the presence of human occupant (stationary or in motion) within a room or zone in which the PIR sensor module 200 is positioned. Particularly, a threshold value comprising a $V_{pp}$ value outputted by PIR sensor 230 that corresponds to the presence of a human occupant (stationary or in motion) within the FOV 70 of the PIR sensor module 200 may be determined by monitoring a voltage output of the PIR sensor 230 as the shutter assembly 240 is operated when a human occupant (stationary and/or in motion) is both present and absent from the room or zone in which the PIR sensor module 200 is located.

Figure 21:
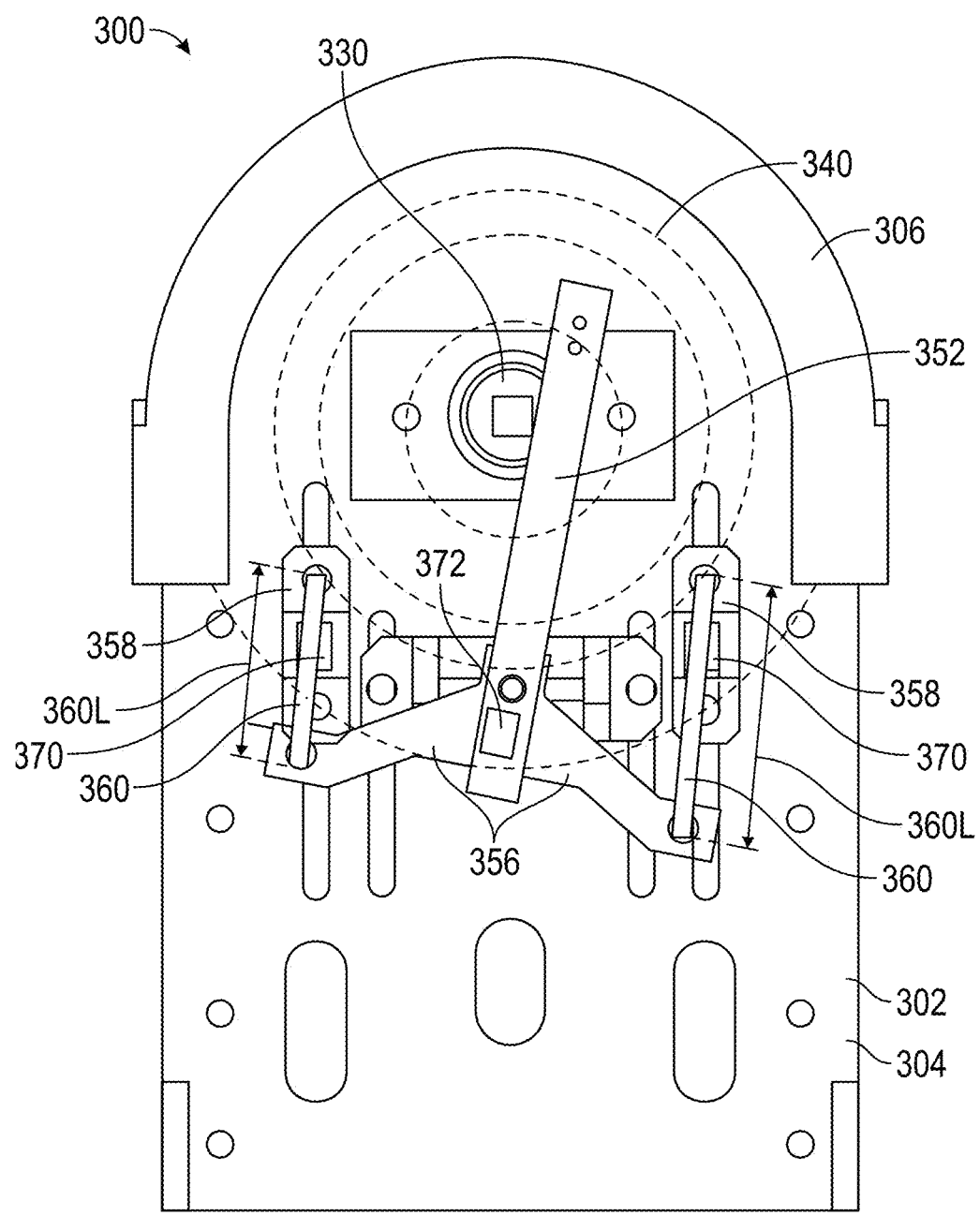
FIG. 21 is a front view of another PIR sensor module of the PIR sensor system of FIG. 1 according to some embodiments.
Figure 22:
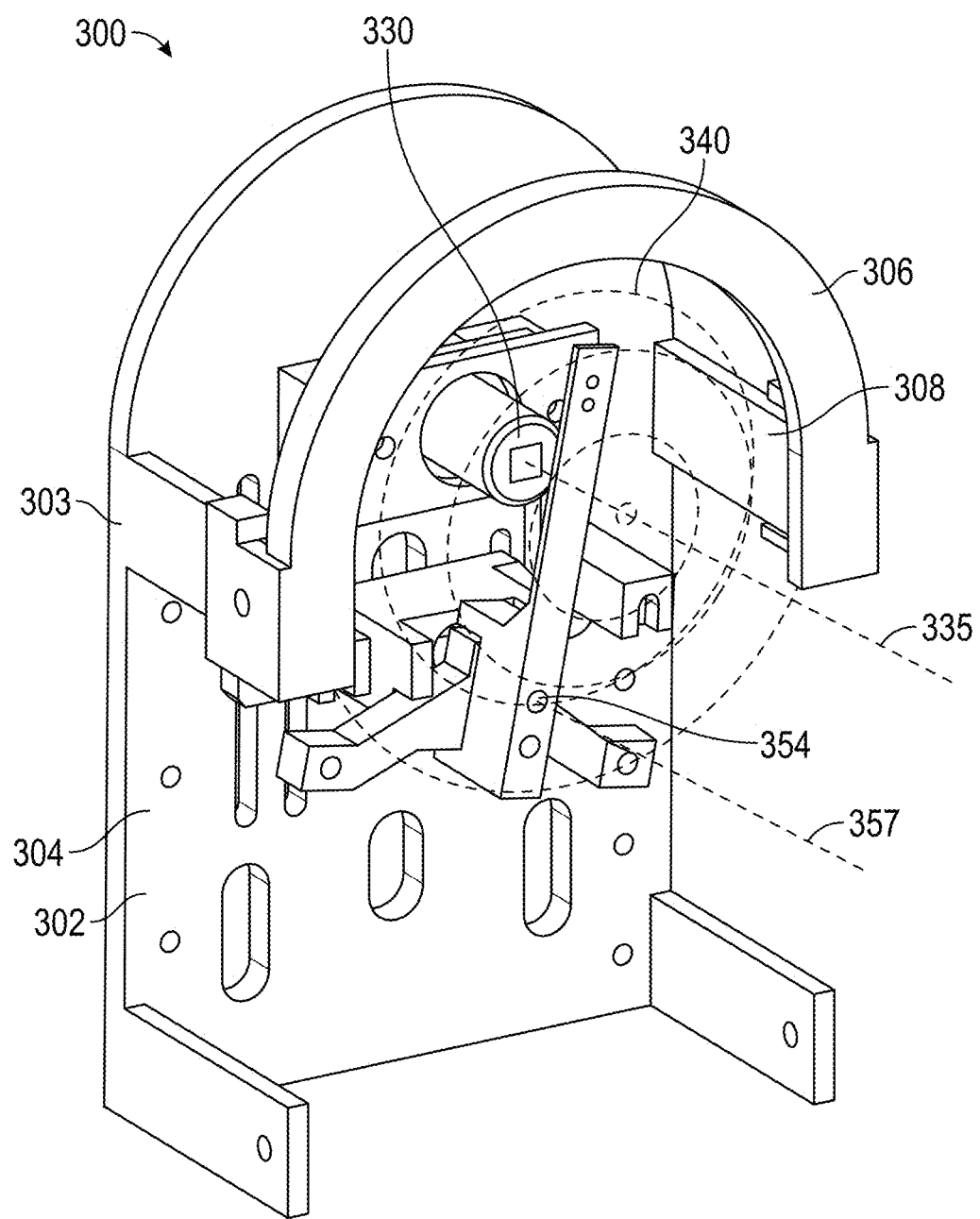
FIG. 22 is a perspective view of the PIR sensor module of FIG. 21.
Figure 23:
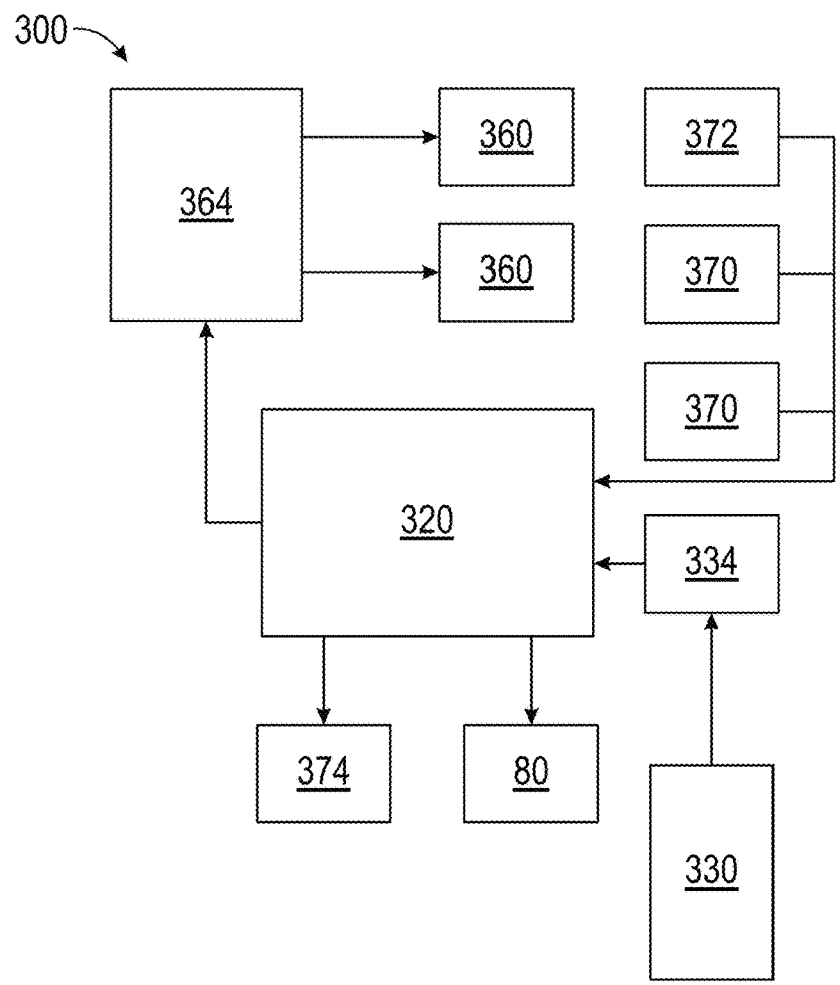
FIG. 23 is a schematic representation of the PIR sensor module of FIG. 21.

Referring to FIGS. 21-23, an embodiment of the PIR sensor module 300 of system 10 is shown. In the embodiment of FIGS. 21-23, PIR sensor module 300 generally includes a housing or support frame 302, a controller or microcontroller unit (MCU) 320, a PIR sensor 330, a lens 340, and a shutter assembly 340 positionable within the FOV 70 of shuttered PIR sensor 330.

Housing 302 of PIR sensor module 300 provides physical support to the components thereof, including PIR sensor 330 and shutter assembly 340. In this embodiment, housing 302 generally includes a planar rear panel 304 and a curved or arcuate lens mount 306 that is coupled to rear panel 304 via a pair of arms 308 extending from the rear panel 304. The lens 340 (shown as transparent in FIGS. 21, 22) of PIR sensor module 300 may be mounted to lens mount 306 and, in some embodiments, may comprise a generally disk shaped Fesnel lens. In some embodiments, housing 302 may include additional components not shown in FIGS. 21-23.

The MCU 320 of PIR sensor module 300 is coupled to housing 302 (e.g., along rear panel 304, for example) and is electrically connected to both the PIR sensor 330 and one or more components of the shutter assembly 340, as will be described further herein. MCU 320 is generally configured to control the operation of PIR sensor module 100, including shutter actuator 110. MCU 320 may be in signal communication with a wireless transmitter 80 of PIR sensor module 100 for transmitting data from PIR sensor module 100 and the controller 12 of the system 10 shown in FIG. 1.

PIR sensor module 300 may also comprise a power supply (not shown in FIGS. 21-23) configured to power MCU 320 as well as other components of PIR sensor module 300 such as PIR sensor 330 and/or shutter assembly 340. In some embodiments, the power supply may comprise one or more electrical batteries; however, in other embodiments, the configuration of the power supply of PIR sensor module 300 may vary.

The PIR sensor 330 of PIR sensor module 300 may generally comprise a PIR sensing element assembly including one or more PIR sensing elements and an oscillator scope for collecting an analog voltage produced by the PIR sensing element assembly of PIR sensor 330. In some embodiments, the PIR sensing element assembly of PIR sensor 330 may be configured similarly or share features in common with the PIR sensing element assemblies 122, 154 shown in FIG. 3. An analog voltage output of the PIR sensor 330 may be connected to an ADC 334 which may feed a digitized output to the MCU 320 of PIR sensor module 300. Additionally, PIR sensor 330 may extend along a longitudinal or central axis 335 which may extend centrally through lens 340 and orthogonally to the rear panel 304 of housing 302.

In some embodiments, shutter assembly 340 of PIR sensor module 300 may generally comprise a mechanical shutter 352, a pair of support arms 356, a pair of shape memory alloy (SMA) elements 360, a pair of temperature sensors 370, and a position sensor 368. As will be discussed further herein, SMA elements 360 may allow for the modulation of IR radiation receive by PIR sensor 330 (providing for the creation of a $V_{pp}$ output from PIR sensor 330) without the need for an electric motor, minimizing the power consumption and noise created by PIR sensor module 300 during operation. For clarity, some of the components of shutter assembly 340 are hidden from view in FIG. 22. Mechanical shutter 352 may comprise an elongate member that is pivotably coupled to the rear panel 304 of housing 302 at a pivot joint 354. In this configuration, mechanical shutter 352 may pivot about a pivot axis 357 relative to the housing 302 and PIR sensor 330 of PIR sensor module 300. As will be described further herein, mechanical shutter 352 may pivot over the PIR sensor 330 and across central axis 335 and thereby change the amount of IR radiation received by the PIR sensor 330.

Support arms 356 of shutter assembly 340 may extend in opposite directions from an end of mechanical shutter 352 that is proximal pivot joint 354. Each SMA element 360 is coupled between an outer end (relative mechanical shutter 352) of one of the support arms 356 and one of a pair of mounts 358 of housing 302, where each mount 358 extends from the rear panel 304 of housing 302.

SMA elements 360 each comprise a SMA material generally configured to memorize or retain a previous form or shape when subjected to a particular stimulus. In this embodiment, each SMA element 360 comprises a Nitonel SMA material; however, in other embodiments, the particular SMA material comprising SMA elements 360 may vary. Additionally, in this embodiment, each SMA element 360 may comprise a biasing member or spring; however, in other embodiments, the configuration of each SMA element 360 may vary.

SMA elements 360 each have an axial or longitudinal length 360L (shown in FIG. 21) which may be altered in response to the application of an electrical stimulus to the SMA element 360. Particularly, the application of an electrical stimulus or signal to one of the SMA elements 360 may result in joule heating of the SMA element 360, thereby altering a temperature of the SMA element 360. The axial length 360L of the SMA element 360 may change in response to the joule heating of the element 360 following the application of the electrical stimulus thereto. In this embodiment, the axial length 360L of each SMA element 360 may decrease in response to the application of an electrical stimulus thereto; however, the response of each SMA element 360 to the application of a stimulus may vary. Additionally, while in this embodiment SMA elements 360 are configured to respond to an electrical stimulus, in other embodiments, SMA elements 360 may respond (e.g., may change the magnitude of their respective axial length 360L) in response to stimuli other than an electrical stimulus, such as a mechanical, magnetic, etc., stimulus.

Shutter assembly 340 may additionally include a shutter actuator 364 (shown in FIG. 23) that is electrically connected to the MCU 320 of PIR sensor module 300. Shutter actuator 364 may be coupled to housing 302, such as to rear panel 304. Shutter actuator 364 may be generally configured to displace the mechanical shutter 342 (via the actuation of SMA elements 360) across an IR sensing element of PIR sensor 330 to at least partially block the IR radiation received by PIR sensor 330 in response to receiving a single actuator signal from MCU 320. MCU 320 may control the actuation of SMA elements 360 through shutter actuator 364. Particularly, MCU 320 may generate and transmit one or more PWM signals to shutter actuator 364, where shutter actuator 364 may receive the transmitted PWM signal, and convert the PWM signal into an electrical stimulus sufficient to actuate a targeted SMA element 360 from a rest or distended state to an actuated or contracted state, where the axial length 360L of the targeted SMA element 360 in the distended state is greater than the axial length 360L of the SMA element 360 in the contracted state. In some embodiments, shutter actuator 364 may increase or amplify the current of each PWM signal received from MCU 320. Thus, the PWM signal transmitted from the MCU 320 to the shutter actuator 364 is targeted to one of the SMA elements 360 such that only one of the SMA elements 360 is actuated by the shutter actuator 364 at a given time.

In response to the actuation of the targeted SMA element 360 from the distended state to the contracted state, the targeted SMA element 360 applies a torque to the mechanical shutter 352 in a particular angular direction about the pivot axis 357. For example, referring briefly to FIG. 24, a graph 380 illustrating a control signal or output voltage of MCU 320 supplied to shutter actuator 364 is shown. In the example of graph 380, a first PWM signal 384 comprising a non-zero voltage is applied for a continuous first time period $T_1$, through the shutter actuator 364, to a first SMA element 360, causing the mechanical shutter 352 to rotate about the pivot axis 357 in a first rotational direction 359. As the mechanical shutter 352 travels in the first rotational direction 359, the mechanical shutter 352 sweeps across the PIR sensor 330 of PIR sensor module 300 from a first side 363 of the PIR sensor 330 to a second side 365 of the PIR sensor 330.

Figure 24:
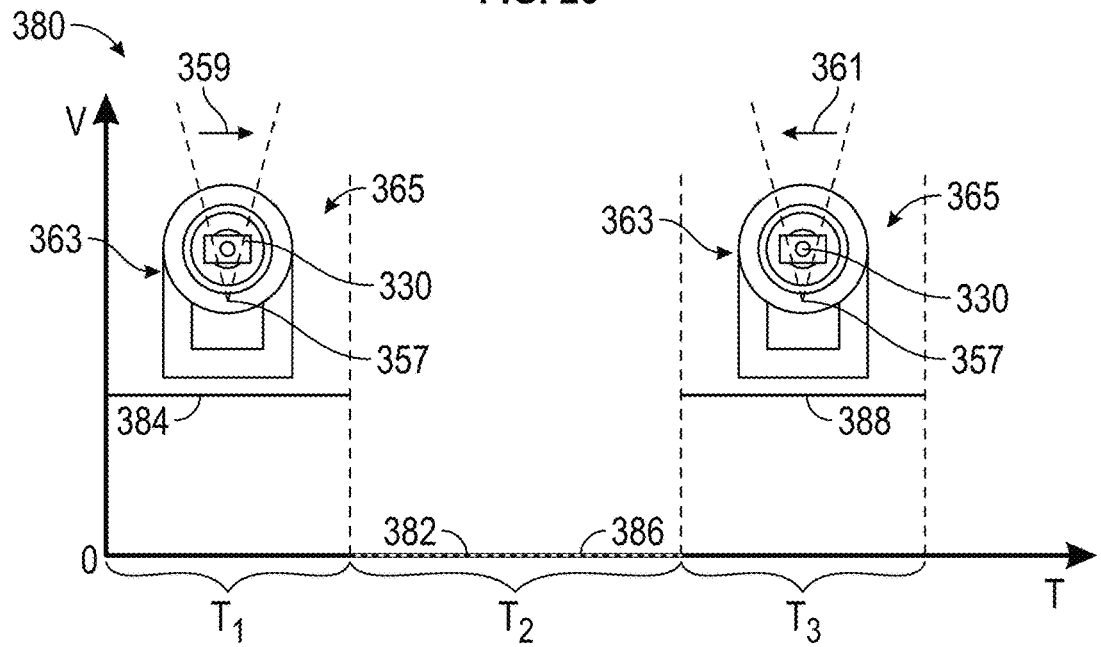
FIG. 24 is a schematic representing an exemplary operation of the PIR sensor module of FIG. 21 according to some embodiments.

In the example shown in FIG. 24, a second continuous time period $T_2$ follows the first time period $T_1$ where an electrical stimulus is not applied to either SMA element 360. In the second time period $T_2$, the first SMA element 360 is permitted to cool and relax while the mechanical shutter 352 remains on the second side of the PIR sensor 330. Additionally, in this example, a third continuous time period $T_3$ follows the second time period $T_2$, where a non-zero voltage is applied for continuously for the third time period $T_3$, through the shutter actuator 364, to a second SMA element 360, causing the mechanical shutter 352 to rotate about the pivot axis 357 in a second rotational direction 361 that is opposite the first rotational direction 359. As the mechanical shutter 352 travels in the second rotational direction 361, the mechanical shutter 352 sweeps across the PIR sensor 330 of PIR sensor module 300 from the second side 365 of the PIR sensor 330 returning to the first side 363 of the PIR sensor 330. Although not shown in FIG. 24, time periods $T_1$-$T_3$ may be repeated indefinitely to cause mechanical shutter 352 to periodically sweep across the PIR sensor 330 of PIR sensor module 300.

As mechanical shutter 352 sweeps across the PIR sensor 330 during the first and third time periods T1, T3, respectively, shutter 352 obstructs or occludes at least some of the IR radiation received by the PIR sensor 330. The period of time during which IR radiation is obstructed by the mechanical shutter 352 may correspond to an ON state of shutter assembly 340 while the period of time during which shutter 352 does not obstruct IR radiation received by PIR sensor 330 may correspond to an OFF state of shutter assembly 340.

Referring again to FIGS. 21-23, PIR sensor module 300 may additionally include a pair of temperature sensors 370 and a rotary position sensor 372. Temperature sensors 370 may be mounted to the housing 302 and may be generally configured to monitor a temperature of each SMA element 360. Temperature sensors 370 may be electrically connected with MCU 320 and may transmit data to the MCU 320 indicative of a temperature of each SMA element 360. MCU 320 may determine from the signals provided by temperature sensors 370 whether each SMA element 360 is in the distended or contracted state. Position sensor 370 may be mounted to mechanical shutter 352 and may monitor an angular position of shutter 352 about the pivot axis 357. In some embodiments, each temperature sensor 370 may comprise a thermopile to permit for the monitoring of the temperature of each SMA element 360 without direct contact between SMA elements 360 and temperature sensors 370. However, in other embodiments, the configuration of temperature sensors 370 may vary. For instance, in other embodiments, temperature sensors 370 may comprise thermocouples or other types of temperature sensors.

Position sensor 372 may also be electrically connected with MCU 320 and may transmit signals to MCU 320 indicative of the angular position of mechanical shutter 352. Based on the signals received from the position sensor 372, MCU 320 may determine whether mechanical shutter 352 is stationary or in motion about pivot axis 357 and whether mechanical shutter 352 is currently in the ON or OFF state. In some embodiments, temperature sensors 370 and position sensor 372 may provide information to MCU 320 that may be used as part of a feedback control mechanism implemented by MCU 320 for controlling the actuation of SMA elements 360.

In some embodiments, PIR sensor module 300 may also include a user interface 374 from which a user of the PIR sensor module 300 may collect or observe information pertaining to the sensor module 300 and/or input commands to the MCU 320 of PIR sensor module 300. In other embodiments, PIR sensor module 300 may not include user interface 374.

Figure 25:
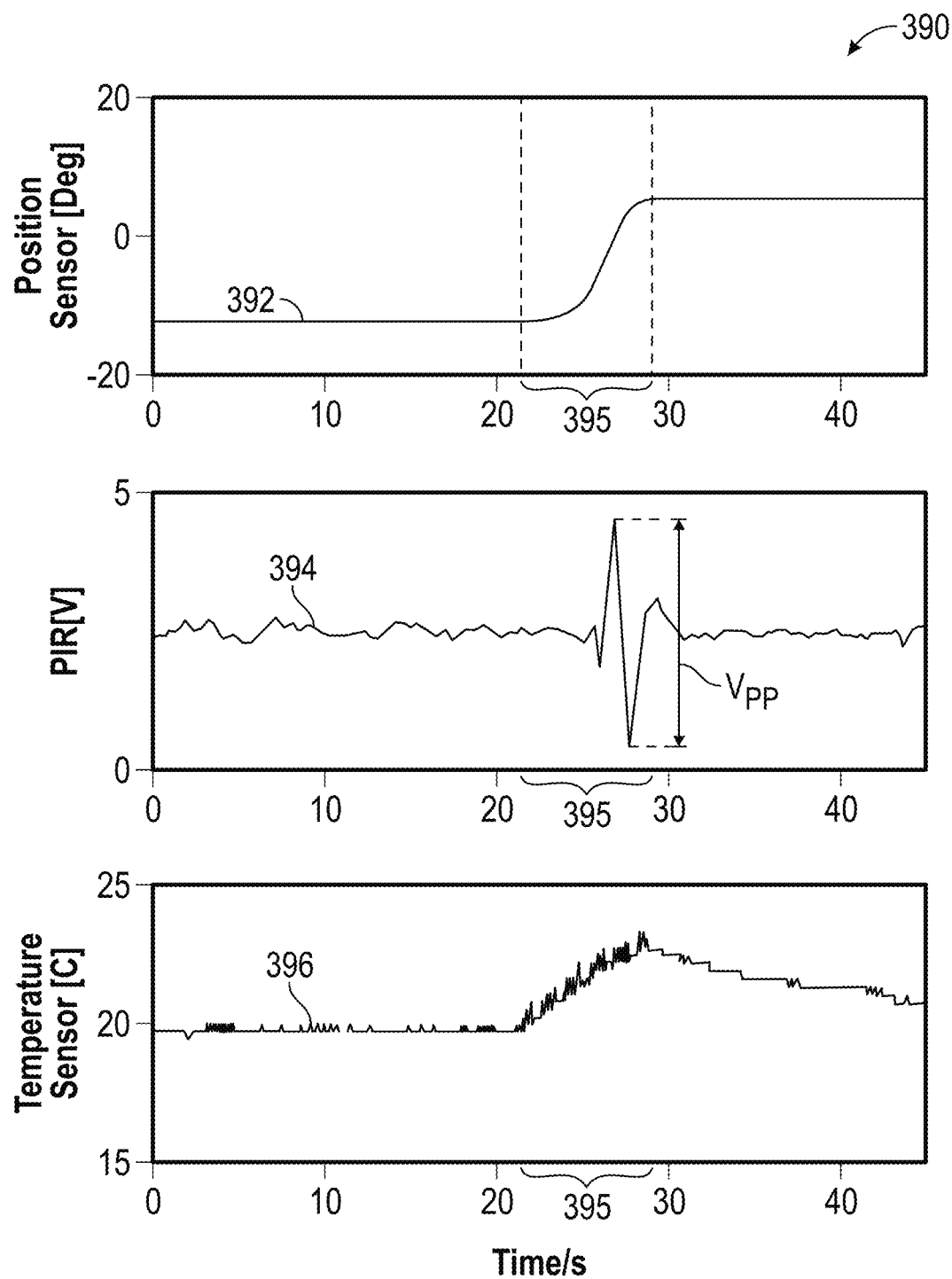
FIG. 25 is a graph illustrating exemplary properties of the PIR sensor module of FIG. 21 according to some embodiments.

Referring to FIG. 25, a graph 390 illustrating an exemplary rotary position 392 of mechanical shutter 352 (measured by position sensor 372), an exemplary analog voltage output 394 of PIR sensor 330, and an exemplary temperature 396 of one of the SMA elements 360 (measured by one of the temperature sensors 370) is shown. In the example shown in FIG. 25, during an actuation time period 395 mechanical shutter 352 sweeps across PIR sensor 330 as indicated by the change in the rotary position 392 of mechanical shutter 352 that occurs during actuation time period 395 and an increase in temperature 396 of the SMA element 360 which occurs during actuation time period 395. Additionally, as mechanical shutter 352 sweeps across PIR sensor 330 (corresponding to the ON state of shutter assembly 340), a peak-to-peak voltage output value $V_{pp}$ of the output voltage 394 may be detected during actuation time period 395.

The $V_{pp}$ value detected during the actuation time period 395 may be used to determine the presence of a human occupant (stationary or in movement) within a room or comfort zone in which the PIR sensor module 300 is positioned. Particularly, Particularly, a threshold value comprising a Vpp value outputted by PIR sensor 330 that corresponds to the presence of a human occupant (stationary or in motion) within the FOV 70 of the PIR sensor 300 may be determined by monitoring a voltage output of the PIR sensor 330 as the shutter assembly 340 is operated when a human occupant (stationary and/or in motion) is both present and absent from the room or zone in which the PIR sensor module 300 is located. Once the threshold value is determined for the PIR sensor module 300, the MCU 320 may monitor the $V_{pp}$ outputted by PIR sensor 330 and transmit one or more signals to the controller 12 indicative of the room or zone in which the PIR sensor module 300 is positioned being occupied by a human in response to the detection of a threshold value from the PIR sensor 330 of PIR sensor module 300.

Controller 12 and MCUs 106, 220, and 320 described above may each comprise a singular controller or control board or may comprise a plurality of controllers or control boards that are coupled to one another. Controller 12 and MCUs 106, 220, and 320 may each comprise at least one processor and associated memory. The one or more processors (e.g., microprocessor, central processing unit (CPU), or collection of such processor devices, etc.) of controller 12 and MCUs 106, 220, and 320 may execute machine-readable instructions provided on the memory (e.g., non-transitory machine-readable medium) to provide controller 12 and MCUs 106, 220, and 320 with all the functionality described herein. Additionally, the memory of controller 12 and MCUs 106, 220, and 320 may comprise volatile storage (e.g., random access memory (RAM)), non-volatile storage (e.g., flash storage, read-only memory (ROM), etc.), or combinations of both volatile and non-volatile storage. Data consumed or produced by the machine-readable instructions of controller 12 and MCUs 106, 220, and 320 can also be stored on the memory thereof. As noted above, in some embodiments, controller 12 and MCUs 106, 220, and 320 may comprise a collection of controllers and/or control boards that are coupled to one another. As a result, in some embodiments, controller 12 and MCUs 106, 220, and 320 may comprise a plurality of the processors, memories, etc.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A passive infrared (PIR) sensor system, comprising:
    a PIR sensor configured to produce an out signal in res se to receiving infrared (IR) radiation;
    an electronic shutter positionable in a field of view (FOV) of the PIR sensor wherein the electronic shutter comprises a liquid crystal (LC) material wherein the electronic shutter comprises a first state providing a first transmissivity of IR radiation through the electronic shutter and a second state providing a second transmissivity of IR radiation through the electronic shutter that is les than the first transmissivity, and
    a shutter actuator configured to apply an actuation signal to the electronic shutter to actuate the electronic shutter between the first state and the second state, and wherein the actuation signal comprises a single pulse-width modulated (PWM) signal.

2. The PIR sensor system of claim 1, further comprising a controller configured to detect the presence of a stationary human occupant within the FOV of the PIR sensor based on the output signal of the PIR sensor.

3. A passive infrared (PIR) sensor system, comprising:
    a PIR sensor configured to produce an output signal in response to receiving infrared (IR) radiation;

an electronic shutter positionable in a field of view (FOV) of the PIR sensor, wherein the electronic shutter comprises a liquid crystal (LC) material wherein the electronic shutter comprises a first state providing a first transmissivity of IR radiation through the electronic shutter and a second state providing a second transmissivity of IR radiation through the electronic shutter that is less than the first transmissivity; and a shutter actuator configured to apply an actuation signal to the electronic shutter to actuate the electronic shutter between the first state and the second state;

wherein the electronic shutter comprises a LC element positioned between a pair of substrates.

4. The PIR sensor system of claim 3, wherein the LC element comprises a polymer dispersed liquid crystal (PDLC) material.

5. The PIR sensor system of claim 3, wherein each substrate comprises a Germanium window.

6. The PIR sensor system of claim 3, wherein the electronic shutter further comprises a pair of electrodes in signal communication with the shutter actuator, and wherein each of the pair of electrodes is positioned between the LC element and one of the pair of substrates.

7. A passive infrared (PIR) sensor system, comprising:
a PIR sensor configured to produce an output signal in response to receiving infrared (IR) radiation;
a mechanical shutter positionable in a field of view (FOV) of the PIR sensor; and
a shutter actuator configured to displace the mechanical shutter across an IR sensing element of the PIR sensor to at least partially block the IR radiation received by the PIR sensor in response to receiving a single pulse-width modulated (PWM) signal.

8. The PIR sensor system of claim 7, wherein the shutter assembly comprises Lavet motor that comprises a stator comprising a pair of arms, a rotor positioned between the pair of arms of the stator, and a solenoid coil positioned about one of the arms of the stator.

9. The PIR sensor system of claim 8, wherein the Lavet motor is configured to rotate the rotor at least 180 in response to receiving the single PWM signal from the shutter actuator.

10. The PIR sensor system of claim 8, further comprising a gear train coupled between the Lavet motor and the mechanical shutter, wherein the gear train is configured to convert a rotational motion of the rotor into a sweeping motion of the mechanical shutter in opposing rotational directions.

11. The PIR sensor system of claim 7, wherein the shutter assembly comprises a shape memory (SMA) element configured to displace the mechanical shutter in response to an electrical current being applied to the SMA element.

12. The PIR sensor system of claim 11, wherein the SMA element comprises a distended state and a contracted state, and wherein the SMA element is configured to rotate the mechanical shutter about a pivot axis in response to being actuated from the distended state to the contracted state.

13. The PIR sensor system of claim 7, further comprising a controller configured to detect the presence of a stationary human occupant within the FOV of the PIR sensor based on the output signal of the PIR sensor.

14. A passive infrared (PIR) sensor system, comprising:
a PIR sensor configured to produce an output signal in response to receiving infrared (IR) radiation; and
a shutter assembly comprising a mechanical shutter positionable in a field of view (FOV) of the PIR sensor, wherein the shutter assembly comprises a shape memory alloy (SMA) element configured to displace the mechanical shutter across an IR sensing element of the PIR sensor to at least partially block the IR radiation received by the PIR sensor in response to receiving an actuator signal.

15. The PIR sensor system of claim 14, wherein the SMA element comprises a distended state and a contracted state, and wherein the SMA element is configured to rotate the mechanical shutter about a pivot axis in response to being actuated from the distended state to the contracted state.

16. The PIR sensor system of claim 15, further comprising a temperature sensor configured to measure a temperature of the SMA element and a position sensor configured to measure an angular position of the mechanical shutter about the pivot axis.

17. The PIR sensor system of claim 14, wherein:
the SMA element comprises a first SMA element and the shutter assembly further comprises a second SMA element;
the first SMA element is configured to rotate the mechanical shutter in a first rotational direction n response to an electrical current being applied to the first SMA element; and
the second SMA element is configured to rotate the mechanical shutter in a second rotational direction opposite the first rotational direction n response to an electrical current being applied to the second SMA element.

18. The PIR sensor system of claim 14, wherein the actuator signal comprises a pulse-width modulated (PWM) signal.

19. The PIR sensor system of claim 14, further comprising a controller configured to detect the presence of a stationary human occupant within the FOV of the PIR sensor based on the output signal of the PIR sensor.

* * * * *